(12) United States Patent
McDonnell et al.

(10) Patent No.: US 7,877,227 B2
(45) Date of Patent: Jan. 25, 2011

(54) SURFACE MEASUREMENT INSTRUMENT

(75) Inventors: Ivor McDonnell, Leicester (GB); Andrew Douglas Bankhead, Leicester (GB); Daniel Ian Mansfield, Leicester (GB)

(73) Assignee: Taylor Hobson Limited, Leicester (GB)

( * ) Notice: Subject to any disclaimer, the term of this patent is extended or adjusted under 35 U.S.C. 154(b) by 104 days.

(21) Appl. No.: 12/162,728

(22) PCT Filed: Feb. 9, 2007

(86) PCT No.: PCT/GB2007/000460
§ 371 (c)(1),
(2), (4) Date: Jul. 30, 2008

(87) PCT Pub. No.: WO2007/091087
PCT Pub. Date: Aug. 16, 2007

(65) Prior Publication Data
US 2009/0012743 A1 Jan. 8, 2009

(30) Foreign Application Priority Data
Feb. 10, 2006 (GB) .............................. 0602758.5

(51) Int. Cl.
*G01B 11/24* (2006.01)
(52) U.S. Cl. .................................................. 702/167
(58) Field of Classification Search ................. 702/167; 700/60, 114; 356/508, 510, 511, 512, 479, 356/497
See application file for complete search history.

(56) References Cited
U.S. PATENT DOCUMENTS 4,053,231 A * 10/1977 Fletcher et al. ............. 356/510
4,225,240 A     9/1980  Balasubramanian
5,471,305 A    11/1995  Yoneda et al.
5,812,407 A     9/1998  Shuzo et al.

(Continued)

FOREIGN PATENT DOCUMENTS

WO    WO 03/078925    *    9/2003

(Continued)

OTHER PUBLICATIONS

Byron S. Lee, Timothy C. Strand, Profilometry with a Coherence Scanning Microscope, published in Applied Optics, vol. 29, No. 26, Sep. 10, 1990, pp. 3784-3788.

(Continued)

*Primary Examiner*—Michael P Nghiem
*Assistant Examiner*—Cindy H Khuu
(74) *Attorney, Agent, or Firm*—RatnerPrestia

(57) ABSTRACT

A surface measurement instrument (1) for obtaining surface characteristic data of a sample surface (13) is described. Relative movement between a reference surface (11) and a sample support (15) is caused to occur while a sensor (16) senses light intensity at intervals along a scan path (SP) to provide a series of intensity values representing interference fringes produced by a region of a sample surface (13) during said relative movement and from which series of intensity values surface characteristic data can be derived. The sample support (15) is both translatable and tiltable in at least one direction perpendicular to a scan direction so that the sample support (15) can be both tilted to cause the scan path (SP) to be normal to the sample surface region and translated to compensate for translation movement due to the tilting.

21 Claims, 11 Drawing Sheets

U.S. PATENT DOCUMENTS

| | | | |
|---|---|---|---|
| 6,184,994 B1 | 2/2001 | Freischlad | |
| 2003/0011784 A1* | 1/2003 | De Groot et al. | 356/512 |
| 2005/0225769 A1* | 10/2005 | Bankhead et al. | 356/497 |
| 2005/0279954 A1* | 12/2005 | Brunfeld et al. | 250/559.11 |
| 2007/0220958 A1* | 9/2007 | Gotthard et al. | 73/105 |
| 2008/0000291 A1* | 1/2008 | Masser | 73/105 |

FOREIGN PATENT DOCUMENTS

| | | |
|---|---|---|
| WO | WO 2004/048886 | 6/2004 |
| WO | WO 2004/104517 | 12/2004 |
| WO | WO 2006/005959 | 1/2006 |

OTHER PUBLICATIONS

International Search Report, dated Aug. 10, 2007.
United Kingdom Office Action dated Dec. 11, 2009.
European Office Action dated Jan. 14, 2010.

* cited by examiner

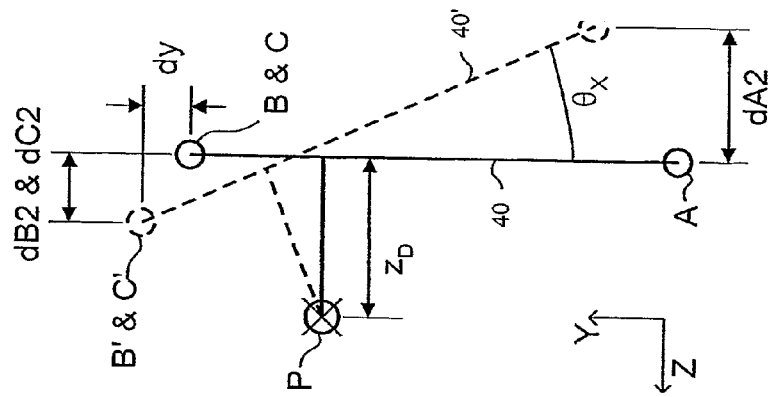
Fig. 8c
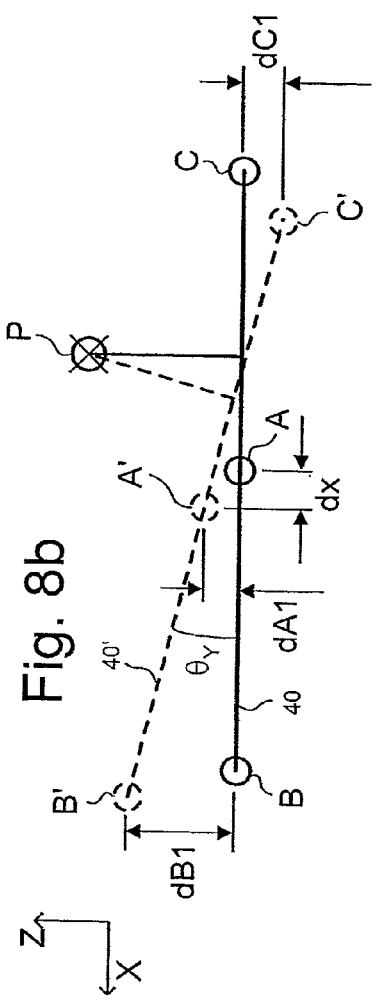
Fig. 8b
Fig. 8a

SURFACE MEASUREMENT INSTRUMENT

This invention relates to a surface measurement instrument for measuring a surface characteristic, in particular but not exclusively a surface measurement instrument such as a broad band or coherence scanning surface measurement instrument.

Coherence scanning or broadband scanning interferometry uses an interferometer (for example a Mirau, Michelson or Linnik interferometer) with a broadband spatially incoherent light source such as a quartz halogen lamp. Generally, but not necessarily, the broadband source will be a white light source. One of the sample surface whose surface characteristic is to be determined and the reference mirror of the interferometer is moved relative to the other along a scan path to change the relative path length and a two dimensional image sensor is used to sense the resulting interference pattern which changes as the sample surface and reference mirror are moved relative to one another.

Each sensing element or pixel of the image sensor senses the portion of the interference pattern for a corresponding portion (herein a "surface pixel") of the sample surface and, as the sample surface and the reference mirror are moved relative to one another, the amount or intensity of light received by the sensing element will vary in accordance with the change in the interference fringes. The intensity of light received from a surface pixel of the sample surface will increase or decrease in amplitude in dependence upon the path length difference between the light paths from the reference mirror and the sensing surface and will have a coherence peak or extremum (maximum or minimum amplitude) at the position of zero path difference. Where different surface pixels of the surface have different relative heights, then those different surface pixels will have coherence peaks at different positions along the scan path. Accordingly, the relative positions of the coherence peaks can be used to provide surface characteristic data representing the relative heights of the different surface pixels of the sample surface.

According to one aspect of the present invention, there is provided a surface measurement instrument for obtaining surface characteristic data of a sample surface, wherein relative movement between a reference surface and a sample support is caused to occur while a sensor senses light intensity at intervals along a scan path to provide a series of intensity values representing interference fringes produced by a region of a sample surface during said relative movement and from which series of intensity values surface characteristic data can be derived, wherein the sample support is both translatable and tiltable in at least one direction perpendicular to a scan direction so that the sample support can be both tilted to cause the scan path to be normal to the sample surface region and translated to compensate for translation movement due to the tilting.

In operation of an embodiment of a surface measurement instrument according to the present invention, light is incident normally of the area of sample surface being measured (that is generally the area within the field of view of the sensor) so as: to maximise the amount of the light that is reflected back by the sample surface to interfere with the light reflected by the reference mirror to provide a good signal-to-noise ratio in the resulting interference pattern detected by the sensor; to avoid introducing additional unknown path length differences which would adversely affect the measurement; to ensure that, as far as possible, the light passes along the optical axis of the optical components to avoid possible optical aberration issues; and to obtain the lowest measurement noise when fringes falling within the measurement area are imaged by the detector so that any external noise sources are common mode.

According to another aspect of the present invention, there is provided a surface measurement instrument for obtaining surface characteristic data of a sample surface, wherein relative movement between a reference surface and a sample support is caused to occur while a sensor senses light intensity at intervals along a scan path to provide a series of intensity values representing interference fringes produced by a region of a sample surface during said relative movement and from which series of intensity values surface characteristic data can be derived, wherein the sample support is both translatable and tiltable, usually in two orthogonal directions perpendicular to a scan direction, a tilt determiner is provided to determine the degree of tilt, usually in the two orthogonal directions, and a controller is operable both to tilt and to translate the sample support so as to tilt the sample support to cause the sample surface region to be brought into an orientation normal to the scan path while also translating the sample support to compensate for any translational movement resulting from the tilting being effected about an axis which is not in the plane of the surface region, thereby maintaining the same region in the field of view of the instrument.

According to another aspect of the present invention, there is provided a surface measurement instrument that can automatically determine the tilt of a surface to be measured to enable an accurate surface profile or measurement to be achieved.

Another aspect of the present invention provides a support apparatus for use in a surface measurement instrument, the apparatus comprising an adjustable sample support stage having a sample support to support the sample to be measured mounted on a translatable base by at least three adjustors each supporting a corresponding location of the sample support and each configured to enable a spacing between the base and sample support at that location to be changed to enable the sample support to be tilted. In an embodiment, the base is translatable in two orthogonal directions in a plane perpendicular to a measurement direction, for example a scan direction, of the surface measurement instrument and the adjustors enable the sample support to be rotated about respective axes in those two directions. In an embodiment, the sample support cannot be rotated about an axis in the measurement direction.

In an embodiment, the orientation of an area of interest of the sample surface can be adjusted and then measurements conducted on that area without a need to recalibrate the instrument.

Yet another aspect of the present invention provides a support stage apparatus for use in a surface measurement instrument for measuring an aspect of a surface, the apparatus comprising an adjustable stage for supporting the surface to be measured, the adjustable stage being adjustable to change the orientation of the surface to be measured relative to a point on the surface by three adjustors that mount the sample support on a base and may be but are not necessarily equiangularly spaced apart about the centre of the base, each of the adjustors being operable to move a corresponding part of the sample support in a direction towards or away from the base so as to tilt the sample support relative to the base and each of the adjustors comprising a wedge assembly having: a base wedge block which is fixed to the base and which has a sloping face which slopes in a direction radially away from the centre of the base; a slidable wedge block slidably mounted on the sloping face of the base wedge block so as to be movable in a direction towards and away from the centre of the base; a slidable support block slidably mounted on the slidable wedge block and supporting the adjustable stage at the respective supported location; and a mover operable to cause the slidable wedge block to move in said direction radially towards or away from the centre of the base such that the slidable support block mounted thereon also moves in said direction towards or away from the base. The use of wedge assemblies is provides an inverse mechanical advantage so that any suitable mover can be used to move the adjustable stage in order to adjust the orientation of the sample surface in controlled measurement intervals, for example in the order of micrometres, without having to use costly micrometre precision motors.

Embodiments of the present invention will now be described, by way of example, with reference to the accompanying drawings, in which.

Figure 1:
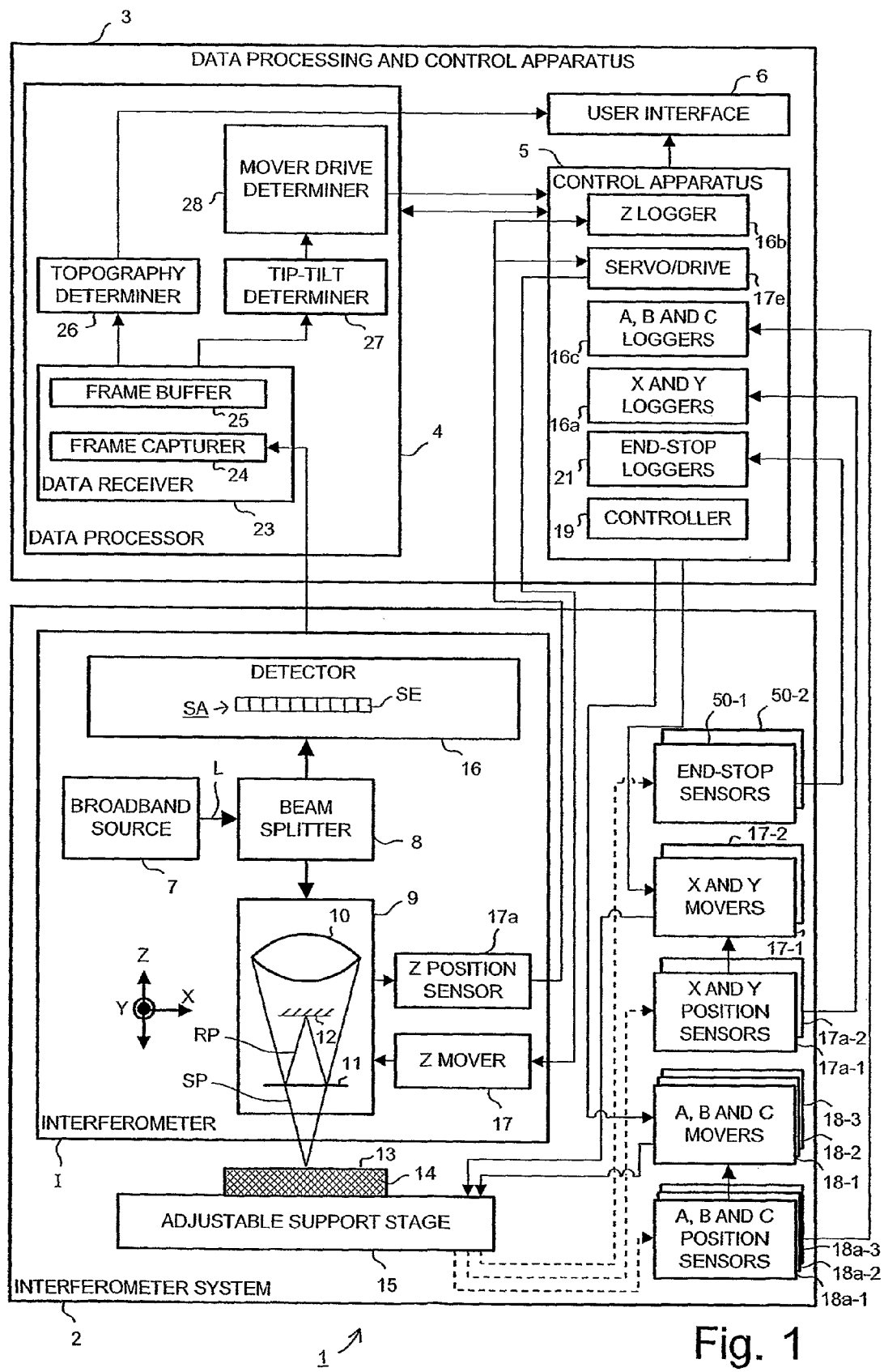
FIG. 1 shows a schematic block diagram of a surface measurement instrument embodying the invention which comprises a broadband scanning interferometer having an adjustable support stage assembly.
Figure 3:
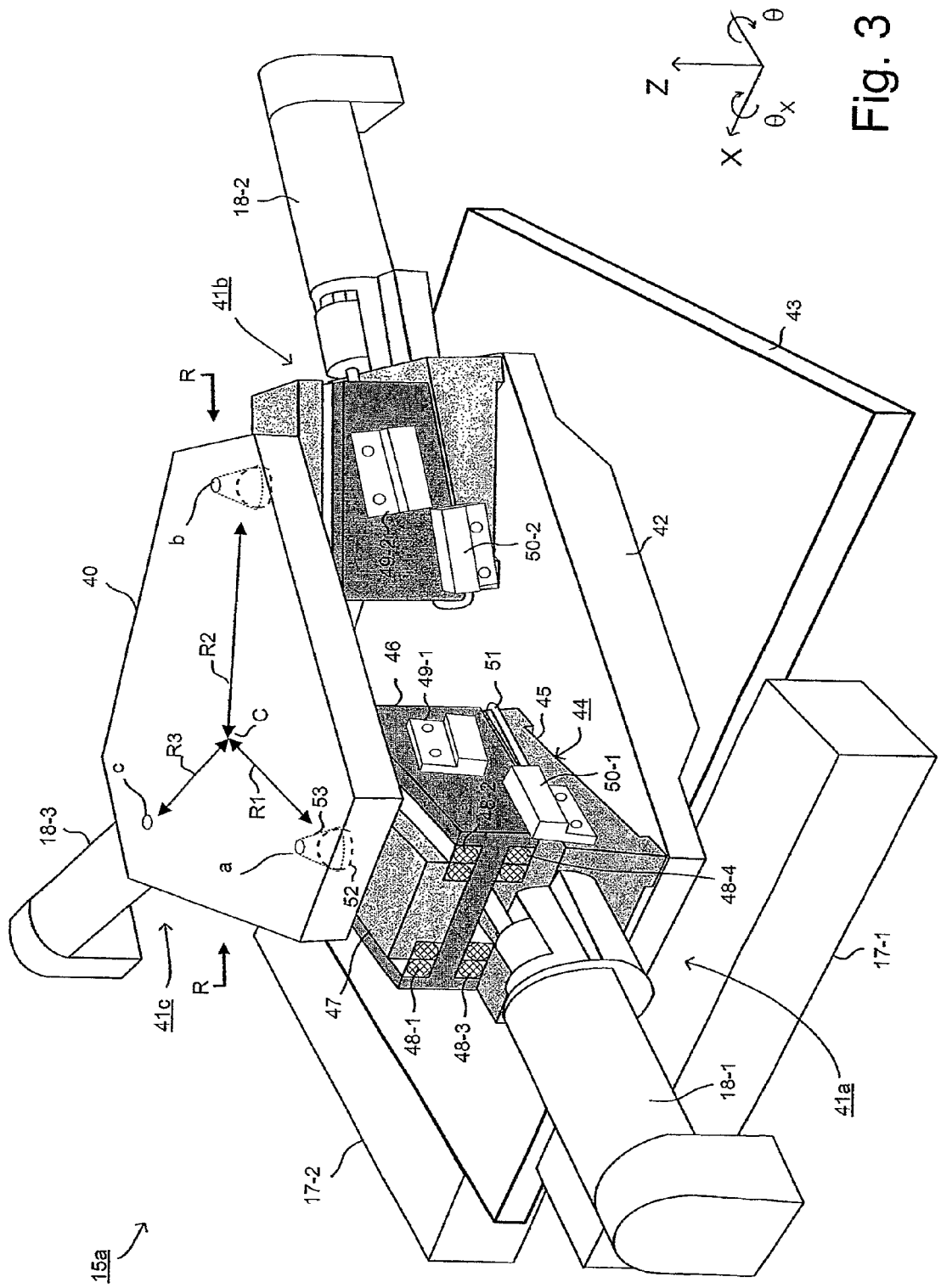
FIG. 3 shows a schematic perspective view of an adjustable support stage assembly of the surface measurement instrument shown in FIG. 1.
Figure 4A:
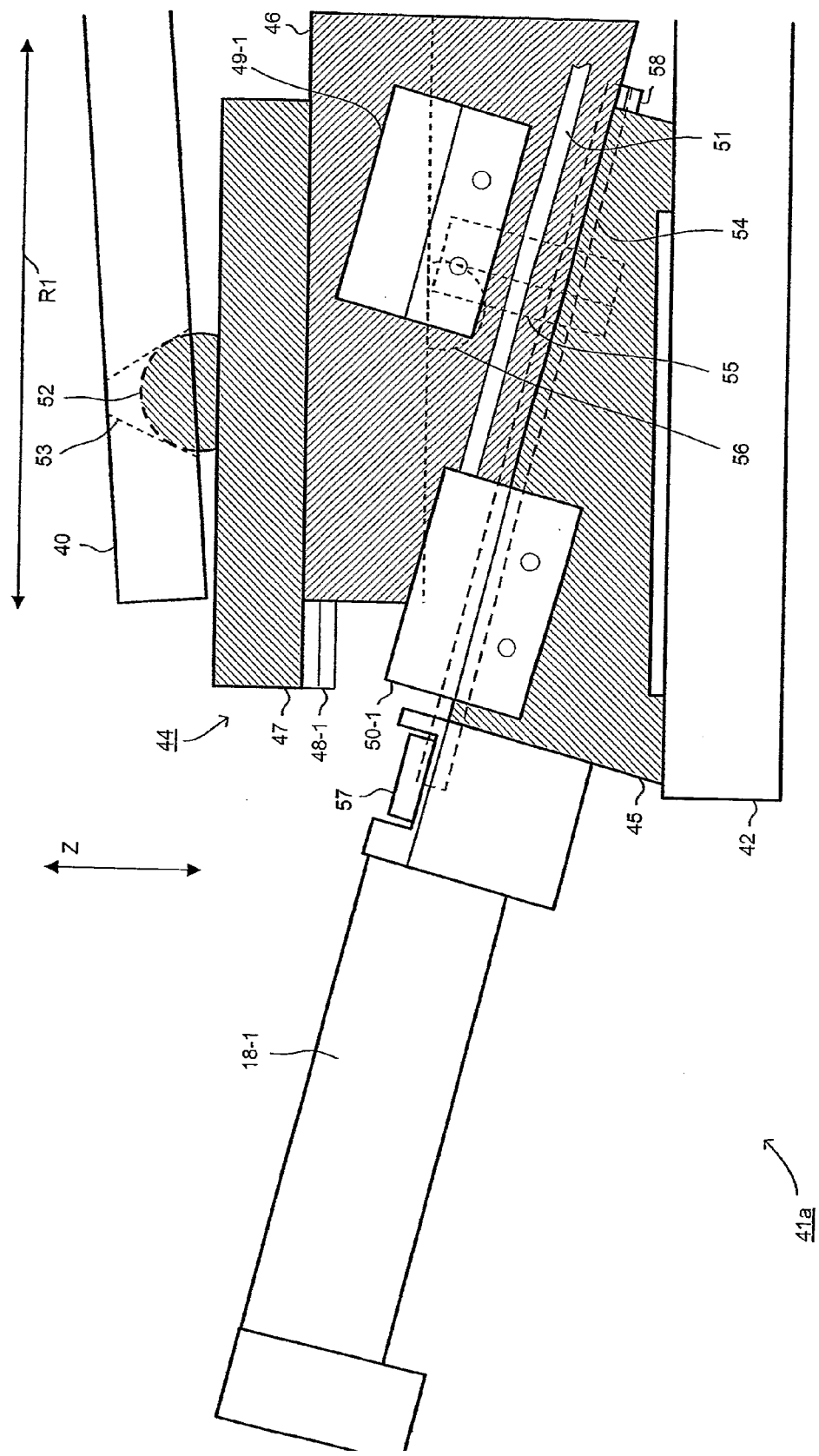
Figure 4B:
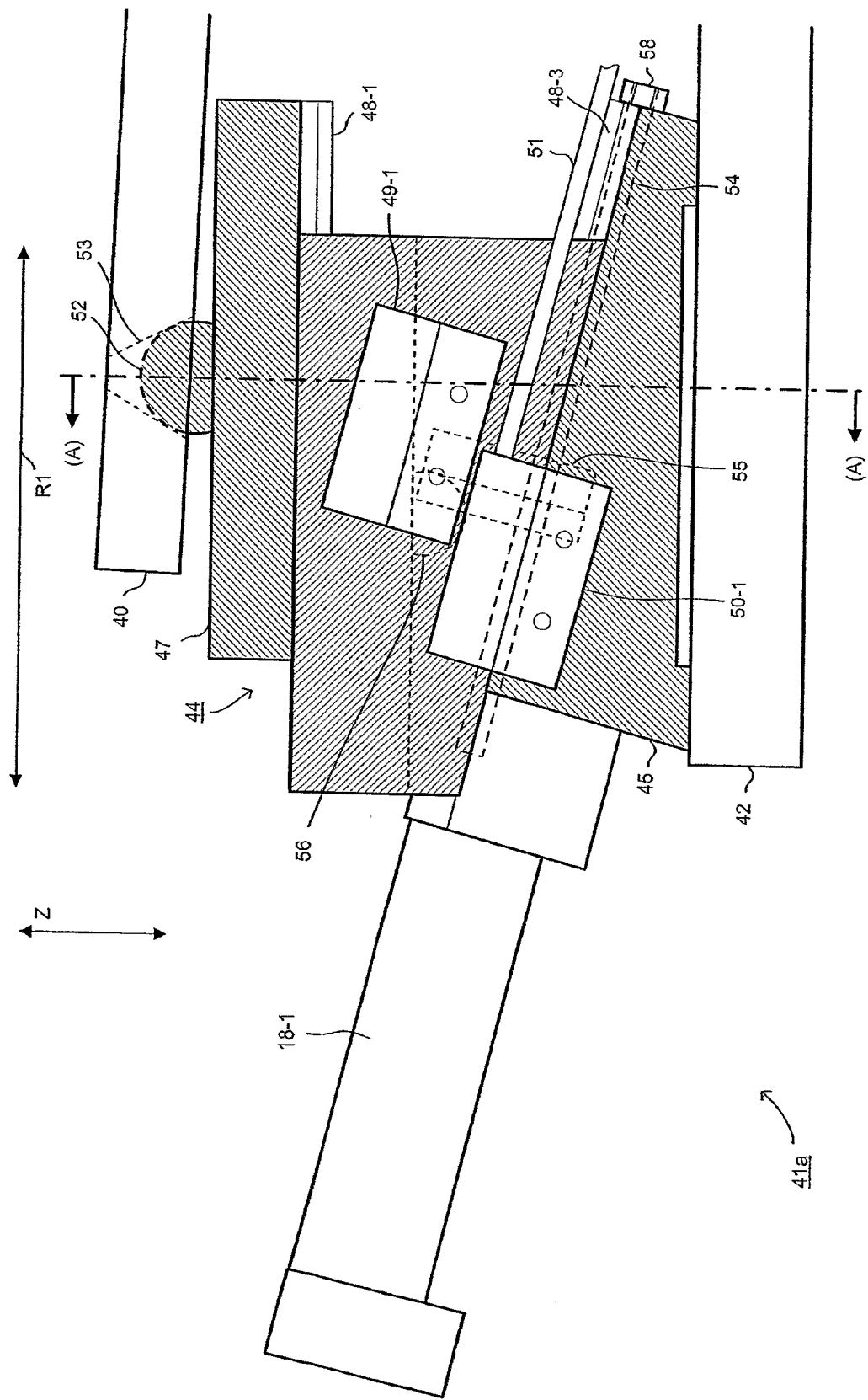
Figure 5A:
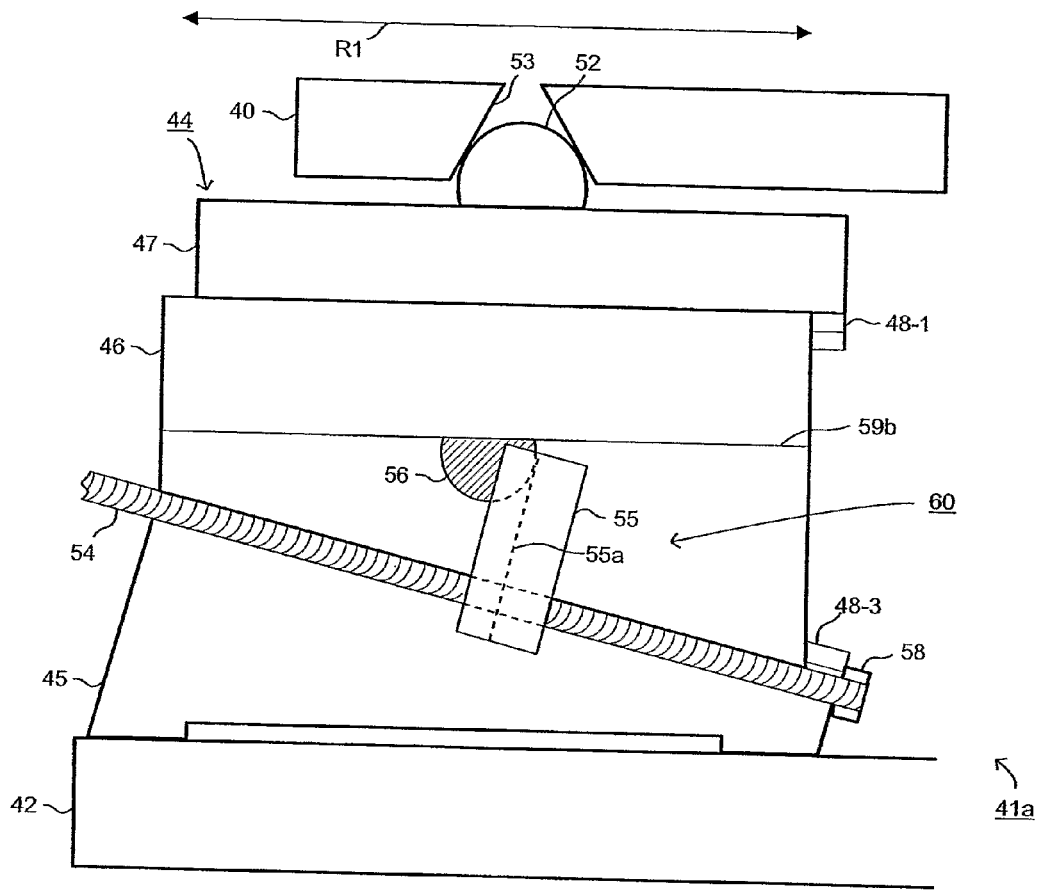
Figure 5B:
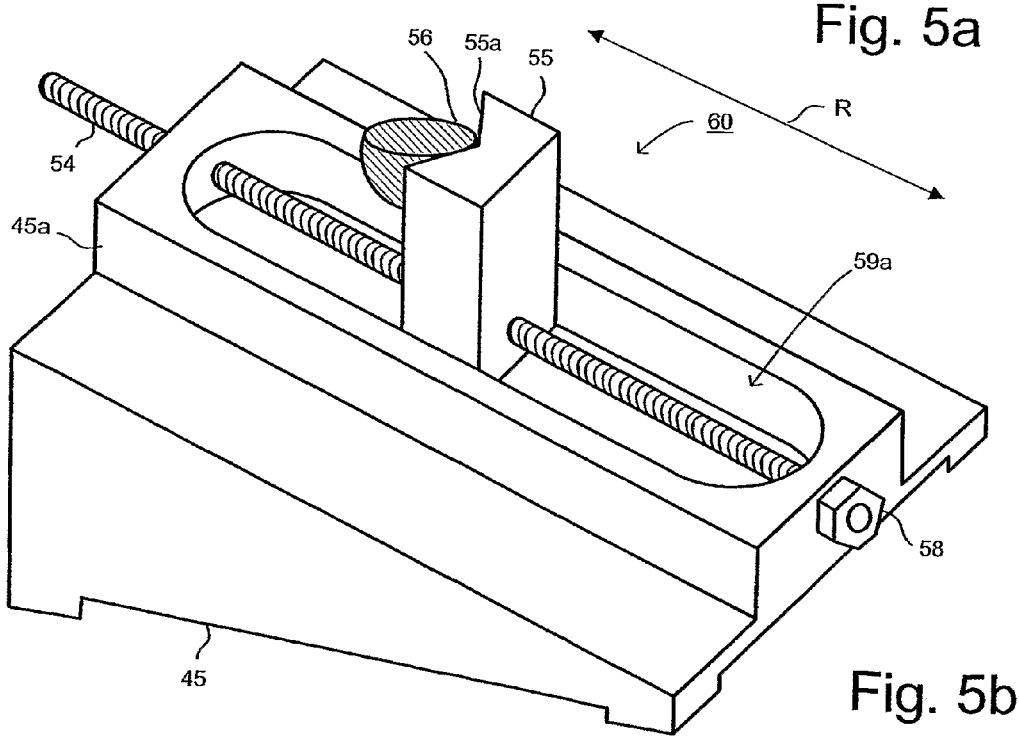
Figure 6:
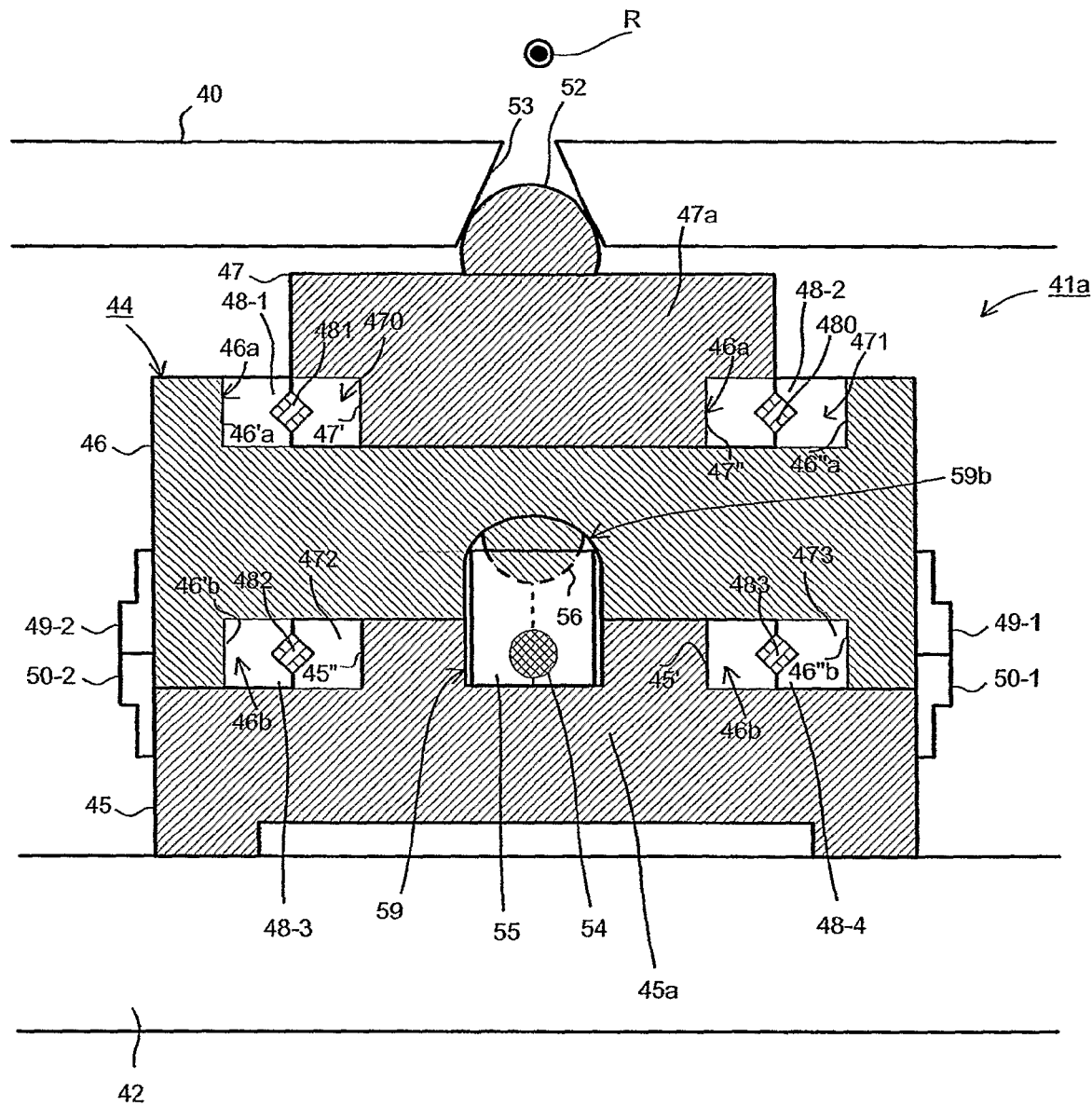
Figure 7:
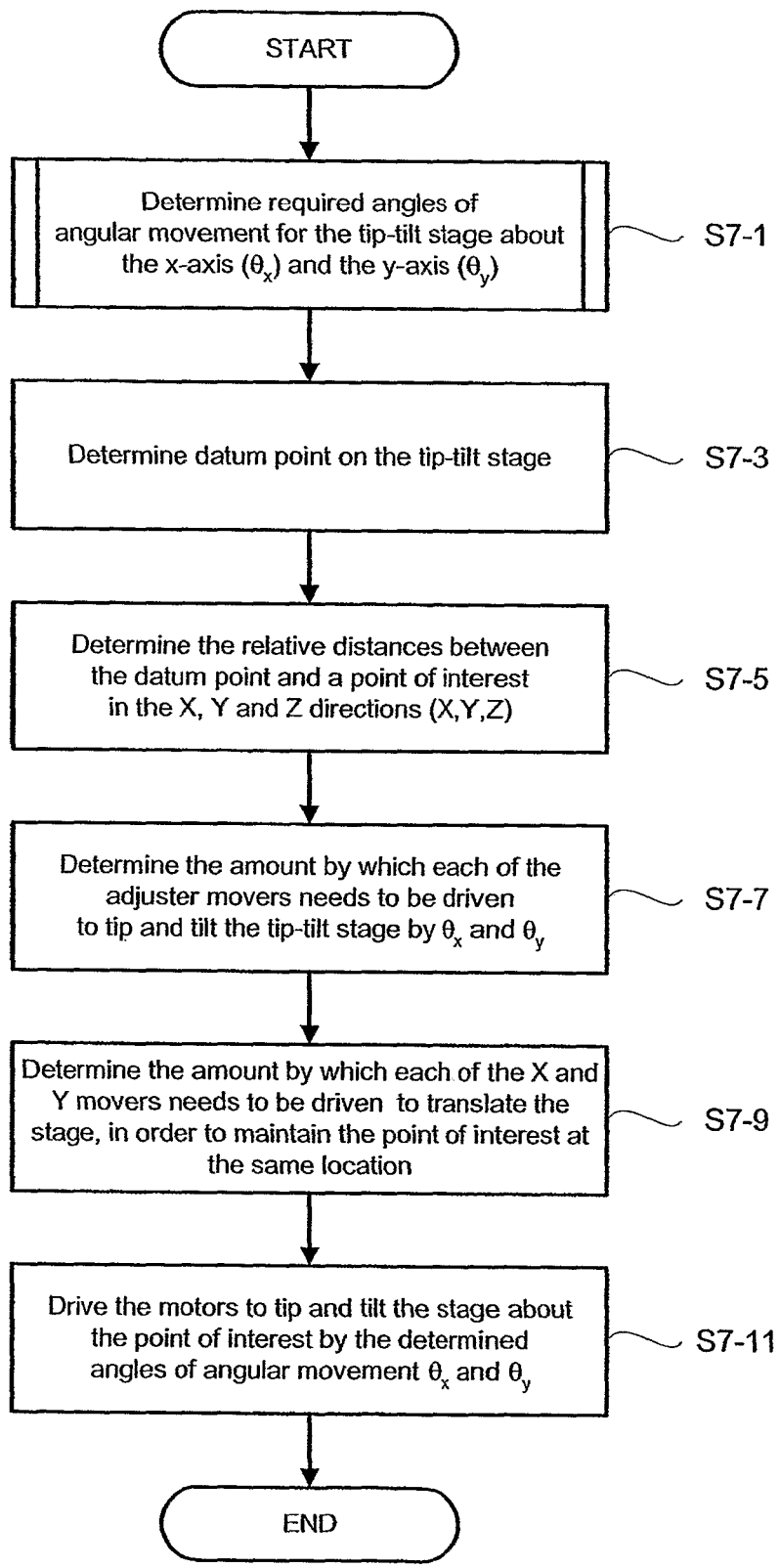
Figure 9:
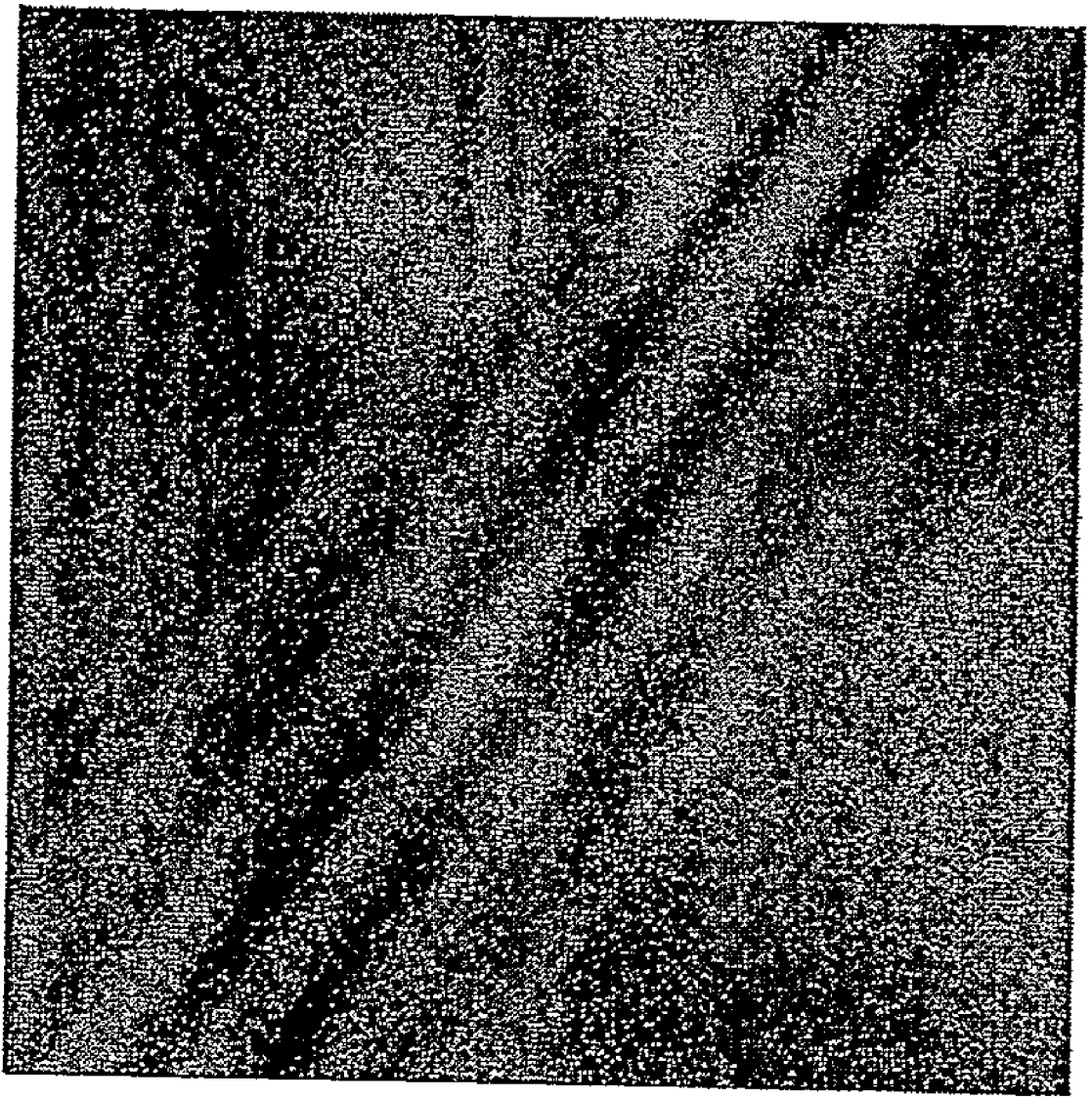
Figure 10:
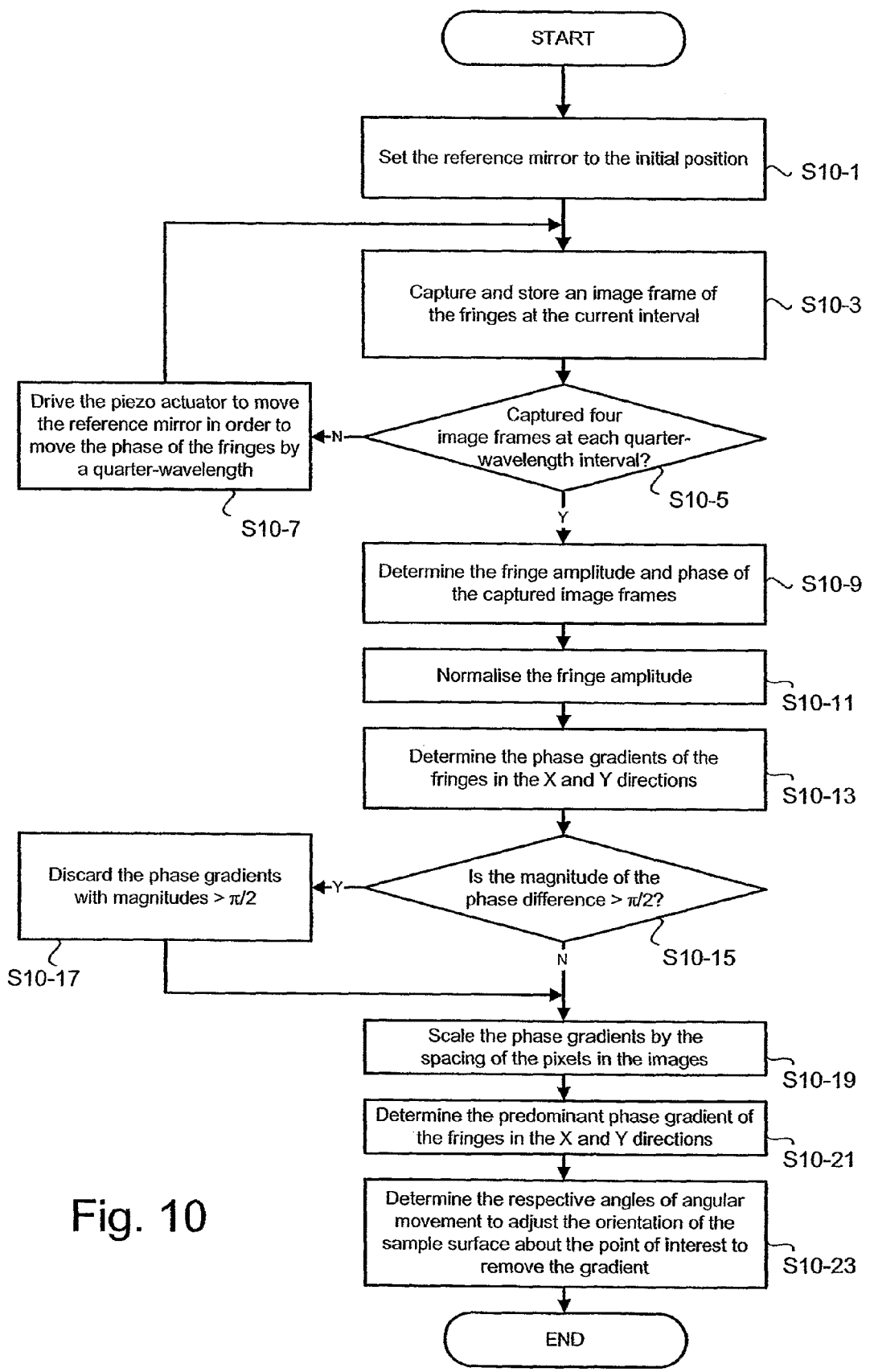

FIGS. 4a and 4b both show schematic side views of part of the adjustable support stage assembly shown in FIG. 3 with the position of a slidable wedge of one adjustor of the adjustable support stage assembly differing in FIG. 4a and FIG. 4b;

FIG. 5a shows a schematic cross-sectional side view taken along the direction R-R in FIG. 3 through a part of the adjustable support stage assembly shown in FIG. 3 that includes an adjustor;

FIG. 5b shows a schematic perspective view of part of one adjustor of the adjustable support stage assembly shown in FIG. 3 to illustrate a drive chain of the adjustor;

FIG. 6 shows a schematic cross-sectional view taken along line A-A in FIG. 4b of part of the adjustable support stage assembly shown in FIG. 3;

FIG. 7 shows a flow chart for illustrating operations carried out by the data processing and control apparatus to cause tipping and tilting of a tip-tilt stage of the adjustable support platform assembly;

FIGS. 8a to 8c show diagrams for use in explaining calculation of the degree of tip and tilt of the tip-tilt stage;

FIG. 9 shows an exemplary image of an interference pattern captured by the broadband scanning interferometer shown in FIG. 1; and FIG. 10 shows a flow chart for illustrating operations carried out by the data processing and control apparatus to determine the degree of tip and tilt of the tip-tilt stage.

Referring now to the drawings, FIG. 1 shows a simplified schematic block diagram of a surface measurement instrument 1 which has a broadband or coherence scanning interferometer system 2 and data processing and control apparatus 3 consisting of data processor 4, control apparatus 5 and user interface 6.

As shown in FIG. 1, an interferometer I of the broadband scanning interferometer system 2 has a broadband source 7, typically comprising, in series, a quartz halogen lamp, a hot mirror, a first collimating lens, a filter changer assembly, a lens which focuses light on to an optical fibre cable, a diffuser and a second collimating lens that provides an emergent light beam L. The filter may be a neutral density filter or a band pass filter, designed to restrict the wavelength range of the light emitted by the broadband source 7, such as a Helium-Neon laser line filter designed to pass light having a Helium-Neon laser line wavelength.

Light L is directed via a beam splitter 8 to an objective lens assembly 9 which includes, in addition to an objective lens 10, a beam splitter 11 and a reference mirror 12.

The beam splitter 11 splits the light beam provided by the beam splitter 8 into a first reference beam that is directed along a reference path RP to the reference mirror 12 and a second sample beam that is directed along a sample path SP (the direction labelled Z in FIG. 1) from the interferometer I towards the surface 13 of a sample 14 mounted on an adjustable support stage 15. Light reflected from the reference mirror 12 returns along the reference path RP to the beam splitter 11 where it interferes with light reflected from the sample surface 13 back along the sample path SP. The interfering light returns along a return path via the beam splitter 8 to a detector 16. The objective lens 10 acts with a camera lens of the detector 16 to focus an image of the region of interference onto the detector 16.

The interferometer may have, for example, a Mirau, Michelson or Linnik configuration. The exemplary interferometer I shown in FIG. 1 has a Mirau configuration.

The objective lens assembly 9, and thus the reference mirror 12, is movable in the Z direction in FIG. 1 by a Z direction mover 17, in this example a piezoelectric mover, under the control of servo/drive circuitry 17e of the control apparatus 5, to effect relative movement between the sample surface 13 and the reference mirror 12 so as to change the difference in the lengths of the paths traveled by light reflected from the reference mirror 12 and light reflected from the sample surface 13. This is equivalent to moving the sample surface 13 along a scan path in the Z direction (as indicated in FIG. 1).

In this embodiment, the detector 16 has, as shown very diagrammatically in FIG. 1, a 2D (two-dimensional) array SA of image sensing elements SE where the array extends in a plane perpendicular to the scan path, that is in the X and Y directions in FIG. 1. The array SA images an area of the sample surface 13 falling within the field of view of the detector 16. Each individual sensing element of the 2D sensing array of the detector 16 detects the portion of the interference pattern falling within the acceptance cone of that element and resulting from a corresponding part (referred to herein as a "surface pixel") of the area of the sample surface 13 so that, effectively, the imaged area of the surface can be considered as a 2D array of surface pixels. In this example, the detector 16 is a CCD (Charge Coupled Device) digital camera, for example, a Vosskuhler GmbH: CCD 1300 CCD digital camera. As another possibility, a CMOS detector having a 2D array of CMOS sensing elements may be used. The sensing elements are generally square to give the same resolution in X and Y.

The detector 16 is arranged to capture or sense the light intensity (i.e. the interference pattern) at intervals as the reference mirror 12 is moved. In this example, the detector 16 captures or senses the light intensity at scan intervals corresponding to movement of the reference mirror 12 by, for example, 75 nm. 2D image or frame data representing the intensity pattern for the field of view of the detector 16 are acquired by the detector 16 at each interval.

The intensity of the illumination sensed by one sensing element SE of the 2D sensing array (that is the portion of the interference pattern provided by light reflected from the corresponding surface pixel of the sample surface 13 imaged on that sensing element SE) varies as the path length difference changes with movement of the reference mirror 12, resulting in a series of fringes which have a coherence peak at the position along the scan path corresponding to zero path length difference.

As is well-known in the art of surface metrology, although the sample surface 13 may be nominally smooth, the surface may have some surface form and surface roughness so that different surface pixels on the surface have different heights. The position or point along the scan path at which the coherence peak occurs will be different for surface pixels at different heights. Accordingly, the surface profile or topology of an area of the surface imaged by the detector can be determined by conducting a measurement operation during which: the Z direction mover 17 moves the objective lens assembly 19 to cause relative movement between the sample surface 13 and the reference mirror 12 along the scan path; images are captured at intervals along the scan path by the detector 16; and the images are analyzed to determine the coherence peak for each surface pixel imaged by the detector 16 and thence to obtain a surface profile or height map for the area of the sample surface being measured.

As so far described, the surface measurement instruments may be as described in WO 2003/078925, WO 2004/048886 and/or WO 2004/104517, the whole contents of which are hereby incorporated by reference.

The adjustable support stage 15 forms part of an adjustable support stage assembly which, as described in WO 2003/078925, WO 2004/048886 or WO 2004/104517 comprises an X mover 17-1 and a Y mover 17-2 for moving the stage 15 in the X and Y directions, respectively, to enable different areas of the sample surface 13 to be brought within the field of view of the detector 16 so that measurements can be made on those different surface areas. Each of the X and Y movers 17-1 and 17-2 is associated with a corresponding position sensor 17*a*-1 and 17*a*-2, respectively. The dashed lines in FIG. 1 indicate that the X and Y position sensors 17*a*-1 and 17*a*-2 may sense movement of the adjustable support stage 15 directly rather than by signals derived from the corresponding mover 17-1 and 17-2.

In addition, the adjustable support stage 15 of the surface measurement instrument shown in FIG. 1 is configured to be tiltable about the X and Y axes to enable an area of a surface to be measured to be positioned to lie in a plane perpendicular to the scan path and the adjustable support stage assembly includes three movers, an A mover 18-1, a B mover 18-2 and a C mover 18-3 for causing this tilting. The A mover 18-1, B mover 18-2 and C mover 18-3 can also be driven to cause a translation in the Z direction. Each of the three movers 18-1, 18-2 and 18-3 is associated with a corresponding position sensor 18*a*-1, 18*a*-2 and 18*a*-3. Again, the dashed lines in FIG. 1 indicate that the A, B and C position sensors 18*a*-1, 18*a*-2 and 18*a*-3 may sense movement of the adjustable support stage 15 directly rather than by signals derived from the corresponding mover 18-1, 18-2 and 18-3.

In the case of the X or Y movers 17-1 or 17-2, where the mover is a motor, then the corresponding position sensor may be a linear grating encoder. In the case of the A, B or C movers 18-1, 18-2 or 18-3, where the mover is a motor, then the corresponding position sensor may be a rotary optical encoder such as a HEDL encoder, or a linear encoder. In this example, the A, B and C movers 18-1, 18-2 and 18-3 are DC motors, for example, Maxon 118889 EC32 motors and the corresponding position sensors are Maxon 110512 500 line HEDL encoders. The X and Y movers 17-1 and 17-2 are stepper motors.

Where the Z mover 17 is a piezoelectric mover, then the Z position sensor 17*a* may be, for example, an interferometric system, such as a grating system, or an LVDT that provides signals representing movement of the objective lens assembly 9 relative to a housing of the interferometer I. For example, the housing of the objective lens assembly 9 may carry a diffraction grating and a fringe detection interferometric system may be mounted within the housing of the interferometer to provide a count of the fringes to the Z data logger 22 as the objective lens assembly 9 moves relative to the interferometer housing. As another possibility, a capacitive sensor may be used. As a further possibility a Michelson interferometer (with a corner cube attached to the housing) may be used.

As will be described below, the interferometer system also has pairs of end stop sensors 50-1 and 50-2 for sensing the ends of movement paths of adjustors driven by the A, B and C movers.

In this example, the control apparatus 5 comprises, in addition to the servo/drive circuitry 17*e*, X and Y data loggers 16*a*, a Z data logger 16*b*, A, B and C data loggers 16*c* and end-stop data loggers 21 each coupled to receive signals from the corresponding sensor. The control apparatus 5 also has a controller 19 for communicating with the user interface 6, data processor 4, and other parts of the control apparatus 5 and for controlling overall operation of the interferometer system 2 so as, for example, to control the servo/drive circuitry 17*e* to cause the Z mover 17 to move the objective lens assembly 9 by a distance corresponding to a scan after each exposure of the 2D image sensor detector 16 so as to capture images at the required intervals, during a measurement operation.

The data processor 4 has a data receiver 23 with a frame capturer 24 for receiving 2D image or frame data acquired by the detector 16 and for storing the received image or frame data in a frame buffer 25. The data processor 4 also has a topography determiner 26 for processing received image or frame data to determine the surface profile or surface topography of a surface area imaged by the detector 16 by determining, for each surface pixel imaged by the detector 16, the position along the scan path at which the coherence peak, or a position having a predetermined relationship to the coherence peak, occurs.

The data processor 4 also has a tip-tilt determiner 27 for processing image or frame data captured by the detector 16 in order to determine the tip-tilt orientation of the area of the sample surface 13 falling within the field of view of the detector 16. This area is referred to herein as the "measurement area".

The data processor 4 also has a mover drive determiner 28 operable to determine, using the tip-tilt orientation calculated by the tip-tilt determiner 27, the degrees of rotation about the X-axis and about the Y-axis required to adjust the orientation of the sample surface 13 so that the surface normal of the measurement area of the sample surface 13 is parallel to the direction of the sample path SP. The mover drive determiner 28 is also operable to determine the amount of movement required to be caused by each of the X, Y, A, B and C movers 17-1, 17-2, 18-1, 18-2 and 18-3 to effect the required tip-tilt orientation adjustment while maintaining the same measurement area in the field of view, and to convert those amounts of movement into respective drive data for supply to the control apparatus 5 to enable the control apparatus to control the movers 17-1, 17-2, 18-1, 18-2 and 18-3 to achieve the required tip-tilt orientation adjustment.

The ability to both tilt and tip and move the adjustable support stage 15 in the two directions orthogonal to the scan path direction (that is the X and Y directions in FIG. 1) enables the adjustable support stage to be adjusted so that light is incident normally of the measurement area thereby: maximising the amount of the light that is reflected back by the sample surface to interfere with the light reflected by the reference mirror to provide a good signal-to-noise ratio in the resulting interference pattern detected by the sensor; avoiding introducing additional unknown path length differences which would adversely affect the measurement; ensuring that, as far as possible, the light passes along the optical axis of the optical components to avoid possible optical aberration issues; and obtaining the lowest measurement noise when fringes falling within the measurement area are imaged by the detector so that any external noise sources are common mode.

Figure 2:
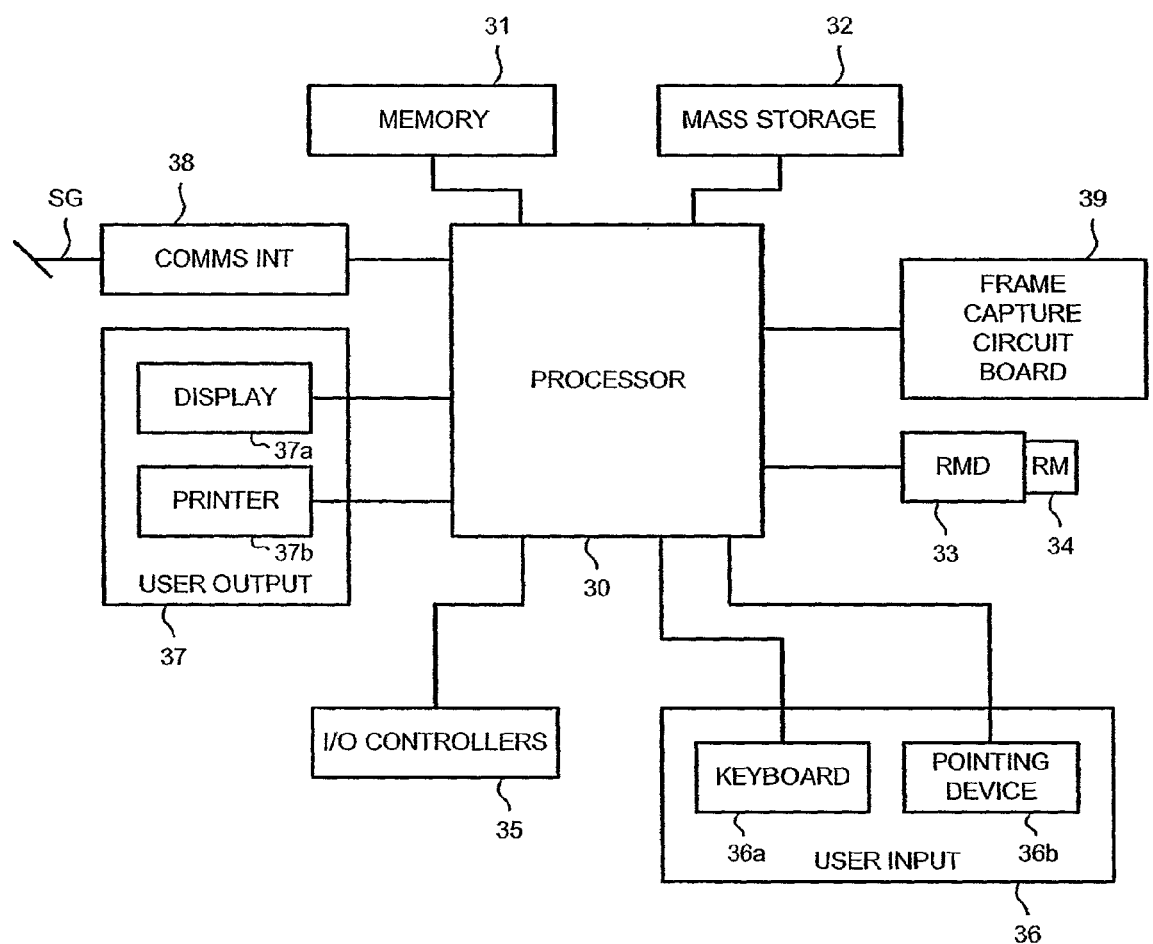
FIG. 2 shows a functional block diagram of a computing apparatus that may be configured to provide a data processing and control apparatus of the surface measurement instrument shown in FIG. 1.

The data processing and control apparatus 3 may be implemented by programming a computing apparatus, for example a personal computer. FIG. 2 shows a simplified block diagram of such a computing apparatus. As shown, the computing apparatus has a processor 30 associated with memory 31 (ROM and/or RAM), a mass storage device 32 such as a hard disk drive, a removable medium drive (RMD) 33 for receiving a removable medium (RM) 34 such as a floppy disk, CD-ROM, DVD or the like, input and output (I/O) controllers 35 for interfacing with the components of the broadband scanning interferometer system 1 to be controlled by the control apparatus 5 (for example, the adjustable support stage 15) to enable the processor 30 to control operation of these components, user input 36 consisting, in this example of a keyboard 36a and a pointing device 36b, and user output 37 consisting, in this example, of a display such as a CRT or LCD display 37a and a printer 37b. The computing apparatus may also include a communications interface (COMMS INT) 38 such as a MODEM or network card that enables the computing apparatus to communicate with other computing apparatus over a network such as a local area network (LAN), wide area network (WAN), an intranet or the Internet. In this example, the computing apparatus has a dedicated frame capture circuit board 39 installed within the computing apparatus to receive the 2D image or frame data from the detector 16.

The processor 30 may be programmed to provide the data processing and control apparatus 3 shown in FIG. 1 by any one or more of the following ways:

1. by pre-installing program instructions and any associated data in a non-volatile portion of the memory 31 or on the mass storage device 32;
2. by downloading program instructions and any associated data from a removable medium 34 received within the removable medium drive 33;
3. by downloading program instructions and any associated data as a signal SG supplied from another computing apparatus via the communications interface 38; and
4. by user input using the keyboard 36a and, if appropriate, the pointing device 36b.

The computing apparatus, when programmed by program instructions to provide the control apparatus 5, enables an orientation adjustment and a measurement operation to be controlled in accordance with instructions received by a user, and the resulting frame data supplied by the detector 16 to be analysed to determine the surface profile or topography of the measurement area of the surface imaged onto the 2D array of the detector 16. The data acquisition and the analysis to determine the coherence peaks for each surface pixel imaged by the detector 16 and thence to obtain a surface profile or height map for the area of the sample surface being measured may be carried out as described in WO2003/078925, WO2004/048886 and/or WO2004/104517.

As those skilled in the art will appreciate, the functional blocks of the data processing and control apparatus 3 illustrated in FIG. 1 are representative of the functionality provided by the apparatus. This functionality is not necessarily provided by separate components but may be integrated within or distributed throughout the apparatus. In addition, the functionality may be implemented by software, by firmware, by hardware such as dedicated circuits, or any combination of these.

An example of a suitable adjustable support stage assembly 15a for the surface measurement instrument shown in FIG. 1 will now be described in detail with the aid of FIGS. 3 to 6 in which FIG. 3 shows a schematic perspective view of the adjustable support stage assembly 15a, FIGS. 4a and 4b show schematic side views of part of the adjustable support stage assembly, FIG. 5a shows a schematic cross-sectional side view taken along the direction R-R in FIG. 3, FIG. 5b shows a schematic perspective view of part of the adjustable support stage assembly, and FIG. 6 shows a schematic cross-sectional view taken along line A-A in FIG. 4b.

The adjustable support stage 15 has an XY stage 43 which, although not shown in FIGS. 3 to 6, is movable in the X and Y directions by the X and Y movers 17-1 and 17-2, respectively. In this example, the X and Y movers 17-1 and 17-2 comprise DC motors coupled to the XY stage 43 by appropriate conventional drive mechanisms such as rack and pinion or ball screw drive mechanisms (not shown).

A base 42 fixedly mounted to the XY stage 43 carries three equiangularly spaced adjustors 41a, 41b and 41c. Each adjustor 41a, 41b and 41c provides a respective one of three support locations a, b and c for a tip-tilt stage 40. As shown in FIG. 3, the tip-tilt stage 40 has a hexagonal shape, with alternate short and long sides. The shape and size of the tip-tilt stage 40 is, however, not important as long as the tip-tilt stage 40 is supported by the adjustors 41a, 41b and 41c at support locations which are spaced apart about the centre C of the tip-tilt stage 40.

The adjustors 41a, 41b and 41c each comprise a respective one of the movers 18-1, 18-2 and 18-3 coupled by a drive train to a corresponding wedge assembly 44. As can be seen most clearly in FIGS. 4a, 4b and 5a, each wedge assembly 44 has a base wedge 45 fixedly mounted to the base 42, a slidable wedge 46 slidably supported on the base wedge 45 and a slidable support block 47 slidably mounted on the slidable wedge 46. In each wedge assembly 44, the cooperating faces of the base wedge 45 and the slidable wedge 46 slope towards the centre of the base 42 so that the distance between these faces and the base 42 increases in a direction away from the centre of the base 42. The cooperating surfaces of the slidable wedge 46 and the slidable support block 47 are parallel to the base 42.

Each slidable wedge 45 is coupled to the drive train of the corresponding mover 18-1, 18-2 or 18-3 so that driving of the corresponding mover 18-1, 18-2 or 18-3 causes the slidable wedge 45 to slide relative to the base wedge 45 in a respective one of three directions R1, R2 or R3 extending radially from and equiangularly spaced about the centre C of the base 42.

Each support location a, b and c is formed by a ball and socket coupling consisting of a ball shaped connector 52 and a frusto-conical seat 53. Each ball shaped connector 52 is mounted in and projects from a corresponding hemispherical recess (not visible in the Figures) machined in the corresponding slidable block 47 and the corresponding frusto-conical seat is provided by a frusto-conical through-hole 53 machined through the tip-tilt stage 40 so as to taper away from the ball connector 52 (the ball shaped connector 52 of the third adjustor 41c is not shown in FIG. 3).

By virtue of the freely slidable slidable blocks 47 and the slidable wedges 46, the wedge assemblies 44 act to convert movement in the radial directions R1, R2 and R3 (FIG. 3) into movement in a direction towards and away from the base 42 (that is in the Z direction in FIG. 3) enabling tilting of the tip-tilt stage about the X and Y axes. Thus, as can be seen by comparing FIGS. 4a and 4b which show schematic side views of part of the adjustable support stage assembly 15a, driving of one of the movers (the mover 18-1 in FIGS. 4a and 4b) to cause the corresponding slidable wedge 46 to slide relative to the base wedge 45 and the slidable support block 47 to slide towards the centre of the base 42 (towards the right in FIG. 4a) decreases the distance between the base 42 and the corresponding support locations a, b or c, thereby tilting the corresponding part of the tip-tilt support stage towards the base 42 in the corresponding radial direction (R1 in FIGS. 4a and 4b) as shown in FIG. 4a while driving of a mover 18-1, 18-2 or 18-3 to cause the corresponding slidable wedge 45 to slide relative to the base wedge 46 and the slidable support block 47 to slide away from the centre of the base (towards the left in FIG. 4b) increases the distance between the base 42 and the support locations a, b or c, thereby tilting the corresponding part of the tip-tilt support stage away from the base 42 in the corresponding radial direction (R1 in FIGS. 4a and 4b) as shown in FIG. 4b.

The wedge assemblies provide an inverse mechanical advantage so that any suitable mover can be used to move the adjustable stage in order to adjust the orientation of the sample surface in controlled measurement intervals, for example in the order of micrometres, without having to use costly micrometre precision motors. The use of wedge assemblies is also advantageous over, for example, levers because: the wedge assembly allows for larger inverse mechanical advantage than a lever because a very shallow wedge may be used whereas a lever would require the drive to be far from the pivot to achieve similar inverse mechanical advantage; the wedge assembly desensitises a lead screw of the drive train from movement of the wedge assembly components; the wedge assembly reduces the effect of instability of the motors which may otherwise cause undesired movement of the stage during measurement; the components of the wedge assembly are under a compressive load rather than a bending load; and the wedge assemblies do not, unlike levers, exhibit arcuate motion which would affect the motion of the adjustable support stage 15.

Any suitable mechanisms may be used for enabling the slidable support block 47 to slide relative to the slidable wedge 46 and for enabling the slidable wedge 46 to slide relative to the fixed base wedge 45.

In this example, as shown best by FIG. 6, the slidable wedge 46 has an I shape in cross-section defining recesses 46a and 46b while the respective surfaces of the slidable block 47 and the fixed wedge 45 facing the slidable wedge each have a T shape in cross-section defining a corresponding central section 45a and 47a received within the corresponding recess 46a and 46b. A respective slideway arrangement 470 and 471 is provided between opposed faces 46'a and 47' and opposed faces 46"a and 47" of the central section 47a and the recess 46a. Similarly a respective slideway arrangement 472 and 473 is provided between opposed faces 46'b and 45' and opposed faces 46"b and 45" of the central section 45a and the recess 46b.

Each slideway arrangement 470, 471, 472 and 473 has a pair of cooperating guide rails 48-1, 48-2, 48-3 and 48-4 with one guide rail of each pair being mounted to the recess face and the other to the opposed face of the corresponding central section 45a and 47a. Between the guide rails of each pair of guide rails is provided a crossed roller slideway 480, 481, 482 and 483 comprising a series of rollers held together between the guide rails by a roller cage with the rollers alternating in direction so as to provide uniform support along the length of the roller cage and thus uniform slidable movement between the guide rails. For example, the crossed roller slideway arrangements may be Ondrives CRW3-75 Crossed Roller Ways, RS Part Number 412-0675.

As mentioned above with reference to FIG. 1, each adjustor has a pair of end stop sensors 50-1 and 50-2. As shown in FIGS. 3, 4a and 4b, the end-stop sensors 50-1 and 50-2 cooperate with corresponding end-stop magnets 49-1 and 49-2. The end-stop magnets 49-1 and 49-2 of an adjustor are mounted one on each side face of the slidable wedge 46 away from the ends and define respective limits of slidable movement of the slidable wedge 46 relative to the base wedge 45 towards or away from the centre of the base 42. The corresponding end-stop sensors 50-1 and 50-2 are mounted one on each side face of the base wedge 45.

In each wedge assembly, one of the end-stop sensors 50-1 is mounted toward the end of the base wedge 45 that is away from the centre of the base 42 (as shown for the first adjustor 41a in FIGS. 3, 4a and, 4b) and the other end-stop 50-2 is mounted on the opposite side face towards the end of the base wedge 45 that is closer to the centre of the base 42 (as shown for the second adjustor 41b in FIG. 3). Each end-stop sensor 50-1 and 50-2 is arranged to detect when the corresponding end-stop magnet 49-1 or 49-2 comes into its sensor range and to provide a signal via a cable 51 (partly shown in FIGS. 4 and 4b) to the corresponding end stop logger 21 of the control apparatus 5 to cause the controller 19 to control the respective mover 18-1, 18-2 or 18-3 to prevent further movement of the associated slidable wedge 45. In this embodiment, the end-stop magnets 49-1 and 49-2 are, for example, RS end-stop magnets RS Part Number 361-5009 and the end-stop sensors 50-1 and 50-2 are, for example, end-stop sensors RS Part Number 361-4999.

The drive trains coupling the movers 18-1, 18-2 and 18-3 to the slidable wedges 46 will now be described with the aid of FIGS. 5a, 5b and 6. (FIGS. 4a and 4b show the drive train in phantom lines.)

FIG. 5a shows a schematic cross-sectional side view through part of the adjustable support platform assembly 15a along the direction of movement R1 of the adjustor 41a while FIG. 5b shows a schematic perspective view of that part of the adjustable support platform assembly with the slidable wedge 46, slidable block 47 and tip/tilt stage 40 removed so as to show the drive train 60 of the adjustor 41a. The mover 18-1 has been omitted from FIGS. 5a and 5b.

As shown in FIGS. 5a and 5b (and also in phantom lines in FIGS. 4a and 4b), each drive train 60 consists of a lead screw 54 coupled at its end most remote from the centre of the base 42 to a mover coupling 57 (omitted from FIGS. 5a and 5b but visible in FIG. 4a) which couples the lead screw 54 to the corresponding mover, as shown in FIGS. 4a and 4b the mover 18-1. In this example, the mover couplings 57 are Unilat Clamp type couplings with a Bore D5 at both ends, for example, Ondrives couplings Part Number UNL18-5/5.

Central sections of the cooperating faces of the base wedge 45 and the slidable wedge 46 having opposed channels 59a and 59b defining a drive train chamber 59. As shown in FIG. 5b, the lead screw 54 enters the drive chain chamber 59 via an aperture in an end face of the base wedge 45 and extends through the chamber 59 to exit via another aperture in the opposed end face of the base wedge 45. The lead screw is supported at the apertures by rolling bearings that constrain the movement of the lead screw to one degree of freedom along its axis so that the lead screw can rotate about its axis relative to the base wedge 45. A bolt 58 is provided on the free end of the lead screw projecting from the end face of the base wedge 45 to hold the lead screw in place.

The portion of the lead screw 54 extending through the drive chain chamber 59 carries a lead screw nut 55 which is guided by the drive chain chamber 59 so as to slide along the drive chain chamber 59 in the movement direction (the direction R1 for the mover 18-1) as the lead screw 54 is rotated by the mover coupling.

As shown in FIG. 5b, the side of the lead screw nut 55 facing the radially outward end of the base wedge 45 is formed with a groove 55a that engages a nut engagement ball 56 received within the drive chain chamber 59 and fixedly attached to the slidable wedge 46. As shown in FIG. 5a, the nut engagement ball 56 is located approximately halfway along the length of the channel 59b. The nut engagement ball 56 engages with the groove 55a so that the only force applied to the nut engagement ball 56 is in the movement direction, that is the direction R1 for the adjustor 41a. The groove 55a and nut engagement ball 56 coupling restricts the movement of the nut to two degrees of freedom and stops it rotating round the lead screw 54.

The weight of the tip-tilt stage 40 (and any sample 14 supported thereon) acts on the slidable support block 47 and the slidable wedge 46, thereby applying a force on the slidable wedge 46 in a direction towards the base 42. The slidable wedge 46 is therefore biassed by gravity in a direction radially inwards along the sloping face of the base wedge 45. However, the engagement of the nut engagement ball 56 of the slidable wedge 46 with the groove 55a of the lead screw nut 55 prevents the slidable wedge from moving except with the lead screw nut 55 when the lead screw is rotated by the corresponding mover.

When the controller 19 of the control apparatus 5 drives the mover 18-1 to rotate the motor coupling 57 in a clockwise or counter-clockwise direction, the lead screw 54 rotates in the same direction. As the lead screw 54 rotates, the lead screw nut 55 through which the lead screw 54 is threaded moves along the channels 59a and 59b towards or away from the centre of the base 42, depending on the direction of rotation of the lead screw 54. As described above, this movement causes the slidable wedge 46 to move towards or away from the centre of the base in the radial direction (R1 for the adjustor 41a) causing the corresponding support locations a, b and c to move towards or away from the base 42 in the Z direction thereby, thereby adjusting the orientation of the tip-tilt stage 40 and the surface 13 of the sample 14 supported thereon.

It will be appreciated that the other two adjustors 41b and 41c are constructed and operate in the same way as the adjustor 41a.

The control apparatus 5 can control the A, B and C movers 18-1, 18-2 and 18-3 of the adjustors 41a, 41b and 41c to cause the tip-tilt stage as a whole to move toward or away from the base 42 in the Z direction. The control apparatus 5 can also control the A, B and C movers 18-1, 18-2 and 18-3 of each respective adjustor 41a, 41b and 41c independently or in any combination to cause the tip-tilt stage 40 to rotate about the X-axis and/or about the Y-axis to adjust the orientation of sample 14 supported thereon.

As described above, the control apparatus 5 can also control the X mover 17-1 and the Y mover 17-2 of the XY stage 43 to translate the tip-tilt stage 40 in the X and Y directions. Therefore, control apparatus 5 can control the adjustable support stage 15 to adjust the position and orientation of the tip-tilt stage 40 in a total of five degrees of freedom. In this embodiment, the adjustable support stage 15 cannot rotate the tip-tilt stage 40 about the Z-axis.

The way in which the data processing and control apparatus 3 controls the adjustable support stage 15 to adjust the position and orientation of the tip-tilt stage 40 in order to adjust the orientation of the area of interest (the measurement area) of the sample surface 13 will now be described with reference to FIG. 7 which shows a flow chart for illustrating the operation of the data processing and control apparatus 3 to tip and tilt the tip-tilt stage 40 of the adjustable support stage 15 in order to rotate the sample surface 13 about a point in the area of interest, this point being the centre of the screen of the camera corresponding to the mid-focal point of the camera lens of the detector 16.

As shown in FIG. 7, at S7-1 the tip-tilt determiner 27 of the data processor 4 carries out a procedure to determine the angle of rotation about the X-axis ($\theta_x$, as shown in FIG. 3) and the angle of rotation about the Y-axis ($\theta_y$, as shown in FIG. 3) required to adjust the orientation of the sample surface so that the area of interest is orthogonal to the scan path direction (the Z direction in FIG. 1). This procedure will be described in greater detail below with reference to FIGS. 9 and 10.

At S7-3 to S7-9, the mover drive determiner 28 then carries out procedures that enable calculation of the amount by which each of the X, Y, A, B and C movers 17-1, 17-2, 18-1, 18-2 and 18-3 of the adjustable support stage 15 needs to be driven to adjust the position and orientation of the tip-tilt stage 40 to achieve the determined required degrees of rotation $\theta_x$, and $\theta_y$, of the sample surface 13 while maintaining a point of interest P at the same X,Y,Z position.

The way in which the mover drive determiner 28 carries out these procedures will be described with the aid of FIGS. 8a, 8b and 8c in which the tip-tilt stage 40 is represented by a triangle having apices A, B and C representing the locations (that is the location of the central axes of the frustoconical holes) of the three ball connectors 52 of the respective adjustors 41a, 41b and 41c and in which a point of interest representing a point within the measurement area of the sample surface 13 (that is the area of the sample surface 13 that is within the field of view of the detector 16) is represented as P. In this example, the point of interest P corresponds to a pixel in the middle of the field of view of the detector 16, which as mentioned above is the mid-focal point of the camera lens of the detector 16.

FIG. 8a shows an X-Y plan view of the tip-tilt stage representation while FIGS. 8b and 8c show views of the tip-tilt stage representation in the X-Z and the Y-Z planes, respectively, and also show, in dashed lines, the tip-tilt stage representation rotated about the X and Y axes by the required amounts $\theta_X$ and $\theta_Y$ with the locations of the points A, B and C after rotation being indicated as A', B' and C', respectively.

Referring back to FIG. 7, at S7-3 the mover drive determiner 28 first determines the X, Y, Z position of a fixed reference datum point D (FIG. 8a) of the tip-tilt stage 40.

In this example, the mover drive determiner 28 determines the location of the reference datum point D in the X-Y plane by determining the location of the conical holes 53 in the surface of the tip-tilt stage 40. The locations of the conical holes 53 are determined using the interferometer I to locate the edges of the holes and thus the peripheries of the holes from which the X,Y locations on the adjustable support stage 15 of the centres of the holes and thus the apices A, B and C can be determined. The datum point D is identified as the point located halfway between the points B and C on the line connecting those two points.

The control apparatus 5 determines the Z coordinate of the reference datum point D by measuring the Z location of the surface of the tip-tilt stage 40. the Z location is determined by using the interferometer I to determine the Z position at which interference fringes of the surface of the tip-tilt stage 40 are visible and for which the image contrast is a maximum. The mover drive determiner 28 then adds the known distance of the centres of the ball connectors 52 from the surface of the tip-tilt stage 40 to the measured Z location so as to determine the Z location of the datum point D. In this embodiment, the calculation of the datum point is performed during a calibration step and then stored as a known constant value.

Then, at S7-5 the mover drive determiner 28 determines the distances $x_D$, $y_D$, and $z_D$ in the X, Y and Z directions, respectively, between the datum point D and the point of interest P about which the tip-tilt stage 40 is to pivot. The determined distances $x_D$, $y_D$, and $z_D$ are calculated by subtracting the X, Y and Z coordinates of the point of interest P from the X, Y and Z coordinates of the datum point D.

Then, at S7-7, the mover drive determiner 28 determines the amount of movement ΔA, ΔB and ΔC required to be caused by each of the A, B and C movers 18-1, 18-2 and 18-3 of the adjustors 41 and then the amount by which each of A, B and C movers 18-1, 18-2 and 18-3 of the adjustors 41 needs to be driven (the "drive amount") in order to achieve that movement so as to tip and tilt the tip-tilt stage 40 by the determined required degrees of rotation $\theta_X$ and $\theta_Y$ about the X and Y axes.

The drive determiner 28 determines the amounts of movement ΔA, ΔB and ΔC as a combination of the amounts of movement dA1, dB1 and dC1 required to achieve the required rotation $\theta_y$ about the Y-axis (FIG. 8b) and the amounts of movement dA2, dB2 and dC2 required to achieve the required rotation $\theta_x$ about the X-axis (FIG. 8c).

The amount of movement required to move the point A to A' is calculated as:

$$\Delta A = dA1 + dA2 \quad (1)$$

where $$dA1 = z_D - z_D \cdot \cos\theta_y + x_D \cdot \sin\theta_y \quad (2)$$

and $$dA2 = z_D - z_D \cdot \cos\theta_x - (H + y_D) \cdot \sin\theta_x \quad (3)$$

and where $x_D$, $y_D$ and $z_D$ are the distances between the point of interest P and the datum point D determined at S7-5, and H is the distance along the Y-axis between point A and points B and C defined by the geometry of the tip-tilt stage 40.

The amount of movement required to move the point B to B' is calculated as:

$$\Delta B = dB1 + dB2 \quad (4)$$

where $$dB1 = z_D - z_D \cdot \cos\theta_y + (U - x_D) \cdot \sin\theta_y \quad (5)$$

and $$dB2 = z_D - z_D \cdot \cos\theta_x - y_D \cdot \sin\theta_x \quad (6)$$

and where U is the distance along the X-axis between datum point D and point B or C defined by the geometry of the tip-tilt stage 40.

The amount of motor movement to move the point C to C' is calculated as:

$$\Delta C = dC1 + dC2 \quad (7)$$

where $$dC1 = z_D - z_D \cdot \cos\theta_y - (U + x_D) \cdot \sin\theta_y \quad (8)$$

and $$dC2 = z_D - z_D \cdot \cos\theta_x - y_D \cdot \sin\theta_x \quad (9)$$

The mover drive determiner 28 then determines the drive amounts required to achieve these amounts of movement ΔA, ΔB and ΔC using the known motor drive characteristics.

Thus, at S7-9, the mover drive determiner 28 calculates the amount movement ΔX and ΔY of the adjustable stage 15 required to be produced by the X and Y movers 17-1 and 17-2, respectively and from this ΔX and ΔY determines the amount by which each of the X and Y movers need to be driven to achieve that amount of movement. The amounts of movement ΔX and ΔY are calculated as the movement required to compensate for movement of the datum point D to a position D' as a result of rotation about the Y-axis by $\theta_y$ (as shown in FIG. 8b) and rotation about the X-axis by $\theta_x$ (as shown in FIG. 8c).

The amount of translational movement in the X direction is calculated as:

$$\Delta x = dx = z_D \cdot \sin\theta_y + x_D - x_D \cdot \cos\theta_y \quad (10)$$

while the amount of translational movement in the Y direction is calculated as:

$$\Delta y = dy = z_D \cdot \sin\theta_x + y_D - y_D \cdot \cos\theta_x \quad (11)$$

It will be appreciated that the above determinations of Δx and Δy are approximations. The departures from the results obtained by more rigorous analysis may be expressed in terms of empirically generated functions:

$$\Delta x - \Delta x_r = A_o \theta_x \theta_y + B_o y \theta_x \theta_y; \quad (10a)$$

$$\Delta y - \Delta y_r = C_o |\theta_y| + B_o x \theta_x \theta_y + D_o (1 - \cos(E_o \theta_y)) \quad (11a)$$

providing correction factors which may be added to Δx and Δy, where $\Delta x_r$ and $\Delta y_r$ are the results obtained by the more rigorous analysis and $A_o$, $B_o$, $C_o$, $D_o$ and $E_o$ are empirically determined constants. These functions have fits to approximately 1 nanometre.

Once the mover drive determiner 28 has determined from the calculated amounts of movement ΔA, ΔB, ΔC, Δx and Δy the amounts by which the respective movers need to be driven (the drive amounts) to achieve that amount of movement then, at S7-11, the control apparatus 5 uses the drive amounts calculated by the mover drive determiner 28 to drive the respective movers 17-1, 17-2, 18-1, 18-2 and 18-3 to tip and tilt the tip-tilt stage 40 about the point of interest P by the degrees of rotation $\theta_x$ and $\theta_y$ determined at S7-1 while maintaining the X, Y position of the point of interest P.

As described above, the tip-tilt determiner 27 determines at S7-1 the required degrees of rotation of the tip-tilt stage 40 about the X and Y axes to render the direction in which light is incident on the measurement area of a sample surface is normal to the sample surface.

One way of determining the required degrees of rotation about the X and Y axes will now be described with reference to FIGS. 9 and 10 in which FIG. 9 shows an example of an image that may be displayed on the display 37a (FIG. 2) of a frame captured by the frame capture circuit board 39 of the data processing and control apparatus 3 at one position along the scan path during a measurement process on a measurement area of a sample surface.

As described above, each pixel of the image shown in FIG. 9 represents, for a particular position along the scan path, the light intensity sensed by a corresponding sensing element of the 2D sensing array and resulting from the interference between the light reflected from the reference mirror 12 along the reference path RP and the light reflected from sample surface 13 along the sample path SP (shown in FIG. 1).

In this example, the tip-tilt determiner 27 calculates the orientation of the measurement area of the sample surface 13 from the predominant phase gradient of the fringes. FIG. 10 shows a flow chart for illustrating this procedure.

Initiation of the tip-tilt determination may be effected by the user using the user interface 6 once a sample to be measured has been mounted on the support stage. When a tip-tilt determination is initiated, at S10-1 in FIG. 10, the objective lens assembly 9 is moved until fringes such as those shown in FIG. 9 are visible in an in-focus image. This movement of the objective lens assembly 9 may be achieved manually by a user viewing the detector output on the display 37a to check for the fringes or automatically by the control apparatus 5 causing movement in the Z direction until the control apparatus determines, using an appropriate auto-fringe finding technique, that the surface image is in focus and the fringes are visible. As an example, the control apparatus 5 may determine that the fringes are visible in the captured image for which the image contrast is a maximum. The control apparatus may effect movement in the Z direction by using the Z mover and/or by driving the A, B and C movers all by the same amount, generally simultaneously.

Once the fringes are determined to be visible and in-focus, then at S10-3 the control apparatus 5 causes the frame capturer 24 to capture the currently sensed image data and store the currently sensed image data in the frame buffer 25.

In this example, the tip-tilt determiner 27 uses four successive frames of image data captured by the frame grabber at quarter-wavelength intervals along the Z-scan path in order to determine the predominant phase gradient of the fringes, that is four successive images captured at a scan interval of $\lambda/4$ where $\lambda$ is the mean wavelength of the interferometer, which mean wavelength may be determined by calibration. Therefore at S10-5 in FIG. 10, the control apparatus 5 determines whether or not four image frames have been captured at quarter-wavelength intervals in the scan path direction and stored in the frame buffer 25. As only the first image frame has been captured, the processing continues to S10-7 where the control apparatus 5 controls the servo/drive 17e to drive the Z mover 17 to move the objective lens assembly 9 (and thus the reference mirror 12) in order to change the path difference by a quarter-wavelength.

The processing of S10-7 and S10-3 is repeated until the control apparatus 5 determines at S10-5 that four image frames have been captured and stored in the frame buffer 25 at quarter-wavelength intervals.

Once four image frames have been captured, at S10-9 the control apparatus 5 causes the tip-tilt determiner 27 to determine a normalised amplitude and an average phase gradient for each pixel of the captured image frames.

Thus, at S10-9, the tip-tilt determiner 27 calculates an amplitude and phase value for each pixel in the field of view of the detector 16.

The intensity at a pixel can be represented as:

$$I(x,y,z) = \bar{I} + m \cos(\Delta\Theta + \delta t) \quad (12)$$

in which $\bar{I}$ is the average intensity, $m \cos \Delta\Theta$ is the fringe or intensity modulation and $m \cos \delta t$ is the effect of the additional phase shift.

For the four phase shifting steps set out above, the corresponding four intensity values obtained for a pixel can be represented as:

$$I_0 = \bar{I} + m \cos \Delta\Theta \quad (13a)$$

$$I_1 = \bar{I} + m \cos(\Delta\Theta + \pi/2) = \bar{I} - m \sin \Delta\Theta \quad (13b)$$

$$I_2 = \bar{I} + m \cos(\Delta\Theta + \pi) = \bar{I} - m \cos \Delta\Theta \quad (13c)$$

$$I_3 = \bar{I} + m \cos(\Delta\Theta + 3\pi/2) = \bar{I} + m \sin \Delta\Theta \quad (13d)$$

so that:

$$\frac{I_3 - I_1}{I_0 - I_2} = \frac{2m \sin \Delta\vartheta}{2m \cos \Delta\vartheta} = \tan \Delta\vartheta \quad (13e)$$

and so the phase is given by:

$$\Delta\vartheta = \arctan \frac{I_3 - I_1}{I_0 - I_2} \quad (14)$$

The tip-tilt determiner 27 calculates the phase for each pixel for the frame for which $\delta t = 0$ in accordance with equation 14 above.

In the example described above, the first of the four phase shifting steps is the image in which the fringes are visible and the $\lambda/4$ scan steps are all positive. However, this need not necessarily be the case. For example, once the image is in focus and the fringes located, the first of the four images may be acquired after a scan step of $-\lambda/4$ so that the four images are taken at intervals of $-\lambda/4$, 0, $\lambda/4$ and $\lambda/2$. This reduces the distance moved in either direction away from the in-focus position which is advantageous if the fringes are likely to occur over only a short distance. It will of course be appreciated that the equations given above will still apply because m $\cos(\Delta\Theta - \pi/2) = \bar{I} + m(\sin \Delta\Theta)$. Also, of course, the four phase shifted images may be acquired in the reverse order.

The tip-tilt determiner 27 also calculates the amplitude A for each pixel of the original acquired image amplitude in accordance with:

$$A = \sqrt{\cos^2 + \sin^2} = \sqrt{(I_0 - I_2)^2 + (I_3 - I_1)^2} \quad (15)$$

The calculated average phase gradients of the fringes are used to determine the predominant phase gradient for the image frames and the calculated fringe amplitudes are used to prevent noise from distorting the average phase gradient.

At S10-11, the tip-tilt determiner 27 normalises the amplitude calculated at S10-9 by dividing the determined amplitude by the mean of the four intensity values $I_0$, $I_1$, $I_2$ and $I_3$.

Then at S10-13, the tip-tilt determiner 27 determines the phase gradient in the X and the Y directions at each pixel location. The phase gradient in the X direction at a pixel location is determined by subtracting the phase value for the pixel to the left from the phase value for that pixel. Similarly, the phase gradient of the fringes in the Y direction at a particular pixel location is determined by subtracting the phase value for the pixel above from the phase value for that pixel. As those skilled in the art will appreciate, the phase values for the pixel to the right and the pixel below could be used instead of the pixel to the left and the pixel above. Also, the pixels used to determine the phase gradient need not be the immediately adjacent pixels but could be the second, third or fourth closest pixel, in each direction. Using a pixel other than the immediately adjacent pixel should have the advantage of reducing the effect of noise. For similar reasons two or three neighbouring pixels, rather than a single neighbouring pixel, may be used in determining the phase gradient.

At S10-15, the tip-tilt determiner 27 determines whether or not the magnitude of any of the phase differences determined at S10-13 is greater than $\pi/2$. Any phase difference with a magnitude greater than π/2 is discarded at S10-17 to prevent phase jumps or steps destroying the average gradient. The phase gradient is also discarded if the normalized amplitude is below a threshold to prevent noise distorting the average phase gradient.

At S10-19, the tip-tilt determiner 27 determines the predominant phase gradient in the X and Y directions from the valid phase gradients. In this embodiment, the predominant phase gradient in each direction is determined by producing histograms of the valid phase gradients in the X direction and in the Y direction, respectively, applying a Gaussian curve-fit to the highest peak in each histogram and taking the position of the peak of the fitted Gaussian as the predominant phase gradient for the respective direction. It may be possible simply to use the highest phase gradient value but if the peak is quite broad this may be difficult to ascertain accurately.

The above assumes that the pitch between surface pixels sensed by adjacent sensing elements is 1 and also is determined using a scan interval represented by phase rather than distance. Accordingly, at S10-21, the tip-tilt determiner 27 scales the predominant phase gradients determined at S10-19 by multiplying each predominant phase gradient by the actual scan step distance divided by π/2 and by dividing each predominant phase gradient by the surface pixel pitch, which surface pixel pitch may be determined in a calibration step in which a circle of known radius is imaged. As another possibility, the actual scan step and surface pixel pitch may be taken into account when determining the phase gradient, that is the scaling may be effected before determination of the predominant phase gradients.

The scaled predominant phase gradient in each direction represents the tangent of the tilt or offset in that direction and so the scaled predominant X and Y phase gradients provide direct indications of the angular offset from the normal for the X and Y directions, respectively. Using the predominant phase gradient rather than an average phase gradient or a best plane fit through the phase gradient data to determine the X and Y tilts or offset angles has the advantage of enabling an accurate indication of the tilt of the sample surface even where the sample surface is stepped. In contrast, using an average phase gradient or a best fit plane through the gradient data may, where the surface is stepped, give tilt results which are distorted by the gradients of the steps themselves and/or by the relative proportions of the measurement area on either side of the step. Of course, where the sample surface is not stepped, then average phase gradient or a best plane fit through the phase gradient data may be used to determine the X and Y tilts or offset angles.

At S10-23, the tip-tilt determiner 27 determines, from the determined predominant phase gradient in the X and Y directions, the corresponding degrees of rotation about the X-axis and about the Y-axis necessary to compensate for these angular offsets so as to bring the measurement area containing the point of interest P into an orientation normal to the scan path direction.

At S10-23 the mover drive determiner 28 then determines the drive amount as explained above with reference to FIG. 7 for each of the X, Y, A, B and C movers 17-1, 17-2, 18-1, 18-2 and 18-3 of the adjustable support stage 15 to achieve the required degrees of rotation $\theta_x$ and $\theta_y$ while maintaining the position of the point of interest P.

The rotations $\theta_x$ and $\theta_y$ of the sample support may cause the fringes to disappear from the in-focus image, where the fringes are off to one side in the in-focus image. The control apparatus may be operable to repeat the fringe finding operation described above (for example by determining the highest contrast ratio image) to bring the fringes back into focus once the sample surface has been levelled, or the user or operator may manually adjust the Z position to bring the fringes back into focus.

As another possibility, the tilt determiner 27 may be operable to use the position of the strong fringes within the image in combination with the phase gradients to determine the Z position change (height offset) required to centre the fringes so that the fringes are visible in the in-focus image when the sample surface is levelled and the control apparatus 5 operable to cause the Z position to be changed by the Z position change determined by the tilt determiner 27. The tilt determiner 27 may determine the X and Y positions of the fringes within the in-focus image by taking moments about the top and the left of the image.

In an example, the tilt determiner 27 is operable first to determine X and Y moments by: multiplying each pixel amplitude above a predetermined threshold separately by the distance to the top edge and the distance to the left edge, respectively, of the image, to give Y and X pixel moment values; accumulating the X pixel moment values to produce an X accumulated value and accumulating the Y pixel moment values to produce a Y accumulated value; and dividing the X and Y accumulated values by the sum of the pixel amplitudes to give X and Y moments $X_M$ and $Y_M$.

The tilt determiner 27 is then operable to estimate or determine the Z position change or height offset required to centre the fringes as being:

$$\Sigma(X_M \tan\theta_x + Y_M \tan\theta_y)$$

that is the sum of {the X moment $X_M$ multiplied by the tangent of the X direction determined tilt $\theta_x$} and {the Y moment $Y_M$ multiplied by the tangent of the Y direction tilt $\theta_y$} Where the angles $\theta_x$ and $\theta_y$ are small angles, the tilt determiner may calculate the height offset from the tilt angles $\theta_x$ and $\theta_y$ radians without calculating the tangents.

The control apparatus 5 is operable to cause this Z position change or height offset to be effected at the same time as the sample surface is levelled by causing the driving of the A, B and C motors to effect this Z position change in addition to the tilting.

In this embodiment, the components of the adjustable support stage 15, such as the tip-tilt stage 40 and the components of the wedge assembly 44, are designed to avoid differential thermal expansion and to provide thermal balancing throughout the whole measurement loop so as to avoid or at least substantially reduce bending or other deformation due to relative thermal expansion or contraction and so that the three adjustors 41a, 41b and 41c expand or contract at the same rate, maintaining the symmetry and balance within the adjustable support stage assembly 15a. As an example, the components may be made of aluminium (which also has the advantage of being easy to machine, lightweight and cheap) although any suitable material with appropriately good thermal conduction properties may be used.

As described above, the tip or tilt is determined by the data processor of the instrument. It may, however, be possible to determine the tip or tilt manually by viewing the fringes and counting the number of fringes within a known distance.

In the embodiment described above, the adjustable support stage is used in a broadband or coherence scanning interferometer system. As those skilled in the art will appreciate, the adjustable support stage may be used to support a sample in different forms of interferometer system. For example, the present invention may be applied to interference systems using a coherent light source such as a laser or to other optical systems.

In the embodiment described above, the adjustable support stage cannot be rotated about the Z-axis. As those skilled in the art will appreciate, the tip-tilt stage can additionally be mounted on a turntable which would enable rotation about the Z-axis.

The adjustable support stage may also be used in other metrology instruments in which it is necessary to align a sample to a datum, such as when measuring surface roundness, surface roughness or surface form. In these examples of non-optical systems, the tip and tilt of the sample can be determined by making measurements on, for example, a standard component of precisely known form and dimensions, such as a right cylinder, and then determining the tip and tilt using conventional form fitting procedures.

In the embodiment described above, the three adjustors are equiangularly spaced on the base and are arranged so that radial inward movement of the wedge assembly causes the corresponding part of the tip-tilt stage tilt. As those skilled in the art will appreciate, it is not necessary for the adjustors to be equiangularly spaced. For example, the adjustors could be arranged to form a T-shaped arrangement, with two adjustors linearly aligned for movement towards and away from one another and the third adjustor arranged for movement in a direction perpendicular to the movement of the other two adjustors. As another example, the three adjustors could be arranged in any Y-shaped configuration. As those skilled in the art will appreciate, the adjustors could be spaced apart by any angle and distance. As another modification, the direction of slope of the faces of the wedge assemblies may be reversed so that radial inward movement lowers rather than raises the corresponding part of the stage.

As described above, the tip-tilt stage has a hexagonal shape. As those skilled in the art will appreciate, this is not essential and the tip-tilt stage could be of any suitable shape or size.

As described above, the tip-tilt stage is supported on each of the adjustors by a ball and socket coupling. As those skilled in the art will appreciate, any other kind of coupling could be used which allows the tip-tilt stage to rotate about the X-axis and about the Y-axis but constrains rotation about the Z-axis. For example, one ball and socket and two ball and V-groove couplings could be used or three ball and V-groove couplings could be used. As another possibility, one ball and socket, one ball and V-groove and one flat coupling could be used.

As described above, the X, Y, A, B and C movers are DC motors. However, as those skilled in the art will appreciate, any suitable motor could be used instead, such as a linear motor or a belt drive. Additionally, as described above, other forms of drive train may be used, for example the motor and lead screw arrangement could be replaced with a ball screw, a Burleigh piezoelectric Inchworm system such as the one described in U.S. Pat. No. 4,874,979 or a Nanomotion piezoelectric micromotor such as the one described in U.S. Pat. No. 5,453,653.

As will be appreciated by those skilled in the art, motion of the sample support relative to the base and translation of the adjustable support stage may be effected in either order or simultaneously. As described above, the wedge assemblies use cross-rollers. As those skilled in the art will appreciate, the cross-roller arrangements could be replaced by any suitable arrangement which allows guided sliding motion between the components of the wedge assembly. For example, the guide rails could be formed of air, oil or plain bearings or a ligament arrangement may be used.

As described above, the A, B and C movers may be driven all by the same amount so as to effect motion in the Z direction. This allows for movement over a larger range in the Z direction than the Z mover. The A, B and C movers may be used to reach the Z position for the start of a measurement operation and the Z mover then used to effect movement during the measurement operation. It is possible that the A, B and C movers may enable movement with sufficient precision to replace the Z mover.

As described above, the tip-tilt determiner 27 determined the required angles of rotation using four frames captured at quarter-wavelength intervals in the scan direction. As those skilled in the art will appreciate, it may possible to perform similar calculations using three or more than four frames taken at different intervals.

The invention claimed is:

1. A surface measurement instrument for obtaining surface characteristic data of a sample surface, the apparatus comprising:
    an adjustable sample support;
    a beam splitter operable to direct light along a sample light path towards a region of a surface of a sample mounted on the adjustable sample support and along a reference light path towards a reference surface such that light reflected by the region of the sample surface and light reflected by the reference surface interfere;
    a mover operable to effect relative movement along a measurement path between the adjustable sample support and the reference surface;
    a sensor operable to sense light representing the interference fringes produced by each of a plurality of surface pixels of a sample surface region during said relative movement;
    a controller operable, in order to effect a measurement operation, to cause said mover to effect said relative movement while said sensor senses light intensity at intervals along a scan path to provide a series of intensity values representing interference fringes produced by a region of a sample surface during said relative movement; and
    a data processor operable to process provided intensity values to derive surface characteristic data for the surface pixels,
    wherein the adjustable sample support is translatable in a plane perpendicular to and tiltable relative to the direction in which light is incident on the sample surface region and wherein an adjustor is provided which is operable to tilt the adjustable support and to translate the adjustable support to compensate for movement of the surface region in said plane so that, during a measurement operation, light is incident normally of the sample surface region; and
    wherein the adjustor comprises a tilt determiner operable to determine the tilt of the sample surface region relative to the sample light path and a mover determiner operable to determine from the determined tilt the degree by which the adjustable sample support needs to be tilted and the amount by which the adjustable sample support needs to be translated so that, during a measurement operation, light is incident normally of the sample surface region.

2. An instrument according to claim 1, wherein the tilt determiner is operable to determine the tilt of the sample region surface relative to the sample light path in each of two orthogonal directions.

3. An instrument according to claim 1, wherein the tilt determiner is operable to determine the tilt of the sample region surface from intensity values representing interference fringes produced by the region of a sample surface during relative movement between the adjustable sample support and the reference surface caused by the controller.

4. An instrument according to claim 3, wherein the tilt determiner is operable to determine the tilt of the sample region surface relative to the sample light path from intensity values representing interference fringes produced by the region of a sample surface at positions spaced apart along the scan path by a distance corresponding to a quarter of the mean wavelength of the light directed at the sample surface.

5. An instrument according to claim 1, wherein the adjustable sample support is translatable in a direction normal to the surface of the adjustable support and wherein the adjustor is operable to translate the adjustable support in said direction normal to the surface of the adjustable support to compensate for movement in that direction arising as a result of tilting of the adjustable support.

6. An instrument according to claim 1, wherein the data processor is operable to determine, for each surface pixel, a position along the scan path at which a coherence peak occurs in the intensity values for that surface pixel and to determine from the relative positions of the coherence peaks for different surface pixels a surface profile or height map for the surface region.

7. A surface measurement instrument for obtaining surface characteristic data of a sample surface, the apparatus comprising:
an adjustable sample support;
a beam splitter operable to direct light along a sample light oath towards a region of a surface of a sample mounted on the adjustable sample support and along a reference light path towards a reference surface such that light reflected by the region of the sample surface and light reflected by the reference surface interfere;
a mover operable to effect relative movement along a measurement path between the adjustable sample support and the reference surface;
a sensor operable to sense light representing the interference fringes produced by each of a plurality of surface pixels of a sample surface region during said relative movement;
a controller operable, in order to effect a measurement operation, to cause said mover to effect said relative movement while said sensor senses light intensity at intervals along a scan path to provide a series of intensity values representing interference fringes produced by a region of a sample surface during said relative movement; and
a data processor operable to process provided intensity values to derive surface characteristic data for the surface pixels,
wherein the adjustable sample support is translatable in a plane perpendicular to and tiltable relative to the direction in which light is incident on the sample surface region and wherein an adjustor is provided which is operable to tilt the adjustable support and to translate the adjustable support to compensate for movement of the surface region in said plane so that, during a measurement operation, light is incident normally of the sample surface region, the surface measurement instrument further comprising:
a tilt determiner operable to determine the tilt of the sample region surface relative to the sample light path from a predominant phase gradient of intensity values representing interference fringes produced by the region of a sample surface; and
a mover determiner operable to determine from the determined tilt the degree by which the adjustable support needs to be tilted and the amount by which the adjustable support needs to be translated to ensure that, during a measurement operation, light is incident normally of the sample surface region.

8. A surface measurement instrument for obtaining surface characteristic data of a sample surface, the apparatus comprising:
an adjustable sample support;
a beam splitter operable to direct light along a sample light path towards a region of a surface of a sample mounted on the adjustable sample support and along a reference light path towards a reference surface such that light reflected by the region of the sample surface and light reflected by the reference surface interfere;
a mover operable to effect relative movement along a measurement path between the adjustable sample support and the reference surface;
a sensor operable to sense light representing the interference fringes produced by each of a plurality of surface pixels of a sample surface region during said relative movement;
a controller operable, in order to effect a measurement operation, to cause said mover to effect said relative movement while said sensor senses light intensity at intervals along a scan path to provide a series of intensity values representing interference fringes produced by a region of a sample surface during said relative movement; and
a data processor operable to process provided intensity values to derive surface characteristic data for the surface pixels,
wherein the adjustable sample support is translatable in a plane perpendicular to and tiltable relative to the direction in which light is incident on the sample surface region and wherein an adjustor is provided which is operable to tilt the adjustable support and to translate the adjustable support to compensate for movement of the surface region in said plane so that, during a measurement operation, light is incident normally of the sample surface region, the surface measurement instrument further comprising:
a tilt determiner operable to determine the tilt of the sample region surface relative to the sample light path from the intensity values representing interference fringes produced by the region of a sample surface at at least three positions spaced apart along the scan path by a distance corresponding to a quarter of the mean wavelength of the light directed at the sample region surface; and
a mover determiner operable to determine from the determined tilt the degree by which the adjustable support needs to be tilted and the amount by which the adjustable support needs to be translated to ensure that, during a measurement operation, light is incident normally of the sample surface region.

9. An instrument according to claim 8, wherein the tilt determiner is operable to determine the tilt of the sample region surface relative to the sample light path from the intensity values representing interference fringes produced by the region of a sample surface at four positions spaced apart along the scan path by a distance corresponding to a quarter of the mean wavelength of the light directed at the sample region surface,
where the light intensity value sensed at a pixel is, for each of the four positions:

$$I_0 = \bar{I} + m \cos \Delta\Theta$$

$$I_1 = \bar{I} - m \sin \Delta\Theta$$

$$I_2 = \bar{I} - m \cos \Delta\Theta$$

$$I_3 = \bar{I} + m \sin \Delta\Theta$$

where $\bar{I}$ is the average intensity, $m^{cos\Delta\Theta}$ fringe or intensity modulation, and wherein the tilt determiner is operable to determine a tilt of the surface region in each of two orthogonal directions by determining a predominant phase gradient in each of the two orthogonal directions from the phase for each pixel, where the phase for a pixel is given by:

$$\Delta\vartheta = \arctan\frac{I_3 - I_1}{I_0 - I_2}.$$

10. An instrument according to claim 9, wherein the tilt determiner is operable to determine the predominant phase in each of the two orthogonal directions by determining the phase difference between that pixel and at least one other pixel in each of the two orthogonal directions.

11. A surface measurement instrument for obtaining surface characteristic data of a sample surface, the apparatus comprising:
an adjustable sample support;
a beam splitter operable to direct light along a sample light path towards a region of a surface of a sample mounted on the adjustable sample support and along a reference light path towards a reference surface such that light reflected by the region of the sample surface and light reflected by the reference surface interfere;
a mover operable to effect relative movement along a measurement path between the adjustable sample support and the reference surface;
a sensor operable to sense light representing the interference fringes produced by each of a plurality of surface pixels of a sample surface region during said relative movement;
a controller operable, in order to effect a measurement operation, to cause said mover to effect said relative movement while said sensor senses light intensity at intervals along a scan path to provide a series of intensity values representing interference fringes produced by a region of a sample surface during said relative movement; and
a data processor operable to process provided intensity values to derive surface characteristic data for the surface pixels,
wherein the adjustable sample support is translatable in a plane perpendicular to and tiltable relative to the direction in which light is incident on the sample surface region and wherein an adjustor is provided which is operable to tilt the adjustable support and to translate the adjustable support to compensate for movement of the surface region in said plane so that, during a measurement operation, light is incident normally of the sample surface region, wherein the adjustable support comprises a base and a sample support supported on the base by at least three actuators positioned at spaced apart locations on the base and each operable to vary the spacing at that location between the base and the sample support and wherein the adjustor is operable to control the actuators to effect movement of the sample support relative to the base.

12. An instrument according to claim 11, wherein the adjustor is operable to control the actuators to tilt the sample support relative to the base.

13. An instrument according to claim 11, wherein the adjustor is operable to control the actuators to translate the adjustable support in said direction normal to the surface of the adjustable support.

14. An instrument according to claim 11, wherein each actuator is operable to convert motion in one direction into motion in a direction orthogonal to the one direction so as to change the spacing between the base and the sample support at the location of that actuator.

15. An instrument according to claim 14, wherein each actuator comprises a slidable wedge assembly.

16. An instrument according to claim 15, wherein each actuator has:
a base wedge block fixed to the base and having a sloping face which slopes in a direction towards or away from a centre of the base;
a slidable wedge block having a sloping face slidably cooperating with the sloping face of the base wedge block to allow movement of the slidable wedge block relative to the base wedge block in the direction towards or away from the centre of the base; and
a slidable support block slidably mounted on the slidable wedge block to allow movement of the slidable support block relative to the slidable wedge block in a direction towards or away from the centre of the base, the slidable support block being coupled to the sample support at a support location.

17. An instrument according to claim 16, wherein each support location comprises a ball and socket coupling.

18. An instrument according to claim 11, wherein respective translators are operable to translate the base in respective ones of two orthogonal directions in said plane.

19. A surface measurement method of obtaining surface characteristic data of a sample surface, the method comprising the steps of:
directing light, by a beam splitter, along a sample light path towards a region of a surface of a sample mounted on an adjustable sample support and along a reference light path towards a reference surface such that light reflected by the region of the sample surface and light reflected by the reference surface interfere;
effecting relative movement by a mover along a measurement path between the adjustable sample support and the reference surface while a sensor senses light intensity at intervals along a scan path to provide a series of intensity values representing interference fringes produced by each of a plurality of surface pixels of a region of a the sample surface during said relative movement; and
processing the provided intensity values to derive surface characteristic data for the surface pixels,
the method further comprising, during a measurement operation, the steps of:
determining, by a tilt determiner, a tilt of the sample surface region relative to the sample light path;
determining, by a mover determiner, from the determined tilt, a degree by which the adjustable sample support needs to be tilted and an amount by which the adjustable sample support needs to be translated so that light is incident normally of the sample surface region; and
responsive to the determination of the degree by which the adjustable sample support needs to be tilted and the amount by which the adjustable sample support needs to be translated, translating the adjustable sample support in a plane perpendicular to and tilted relative to the direction in which light is incident on the sample surface region to compensate for movement of the surface region in said plane so that light is incident normally of the sample surface region.

20. A non-transitory computer readable storage medium storing program instructions to cause a processor apparatus to cause a measurement instrument to carry out a method in accordance with claim 19.

21. A surface measurement instrument for obtaining surface characteristic data of a sample surface, the apparatus comprising:
adjustable sample support means for supporting a sample;
directing means for directing light along a sample light path towards a region of a surface of a sample mounted on the adjustable sample support means and along a reference light path towards a reference surface such that light reflected by the region of the sample surface and light reflected by the reference surface interfere;
mover means for effecting relative movement along a measurement path between the adjustable sample support means and the reference surface;
sensing means for sensing light representing the interference fringes produced by each of a plurality of surface pixels of a sample surface region during said relative movement;
controlling means, in order to effect a measurement operation, for causing said mover means to effect said relative movement while said sensing means senses light intensity at intervals along a scan path to provide a series of intensity values representing interference fringes produced by a region of a sample surface during said relative movement; and
processing means for processing provided intensity values to derive surface characteristic data for the surface pixels,
wherein the adjustable sample support means is translatable in a plane perpendicular to and tiltable relative to the direction in which light is incident on the sample surface region and wherein adjustor means are provided for tilting the adjustable support and translating the adjustable support to compensate for movement of the surface region in said plane so that, during a measurement operation, light is incident normally of the sample surface region,
wherein the adjustor means comprises tilt determining means to determine the tilt of the sample surface region relative to the sample light path and mover determining means operable to determine from the determined tilt the degree by which the adjustable sample support means needs to be tilted and the amount by which the adjustable sample support means needs to be translated so that, during a measurement operation, light is incident normally of the sample surface region.

* * * * *